United States Patent [19]
Schalles et al.

[11] Patent Number: 5,477,947
[45] Date of Patent: Dec. 26, 1995

[54] AUTOMOBILE SHOCK ABSORBER WITH FREQUENCY-SELECTIVE ACTION

[75] Inventors: Walter Schalles, Windeck-Rosbach; Heinz Knecht, Eitorf; Joachim Lenze, Hennef, all of Germany

[73] Assignee: Fichtel & Sachs AG, Eitorf, Germany

[21] Appl. No.: 225,173

[22] Filed: Apr. 8, 1994

[30] Foreign Application Priority Data

Apr. 8, 1993 [DE] Germany .................. 43 11 567.5
Aug. 14, 1993 [DE] Germany .................. 43 27 358.0

[51] Int. Cl.⁶ ........................................ F16F 9/04
[52] U.S. Cl. .............................. 188/298; 188/314
[58] Field of Search ..................... 188/274, 286, 188/287, 297, 298, 314, 315, 316

[56] References Cited

U.S. PATENT DOCUMENTS 3,945,663 3/1976 Duckett .................. 188/315 X
4,629,169 12/1986 Arnaud et al. ............ 188/274 X
4,697,674 10/1987 Tangorra ................. 188/298
5,094,325 3/1992 Smith .................... 188/314 X

FOREIGN PATENT DOCUMENTS 3902743 7/1990 Germany ................. 188/316
4024966 2/1992 Germany .
4029596 3/1992 Germany .
3281418 12/1991 Japan .................... 188/297
1243964 7/1986 U.S.S.R. ................. 188/314
740920 11/1955 United Kingdom ........... 188/314

Primary Examiner—David M. Mitchell
Assistant Examiner—Kevin D. Rutherford
Attorney, Agent, or Firm—Nils H. Ljungman & Associates

[57] ABSTRACT

A shock absorber with frequency-selective action, in particular for motor vehicles, can have a working cylinder filled with a damping fluid and divided into two working chambers by a piston which has throttle valves and is fastened to a piston rod. For optimal damping adjustment in vehicle-relevant frequency ranges, the working cylinder can preferably be provided with at least two hydraulic capacitances, one of which can be connected to the lower working chamber by way of a hydraulic inductance.

8 Claims, 21 Drawing Sheets

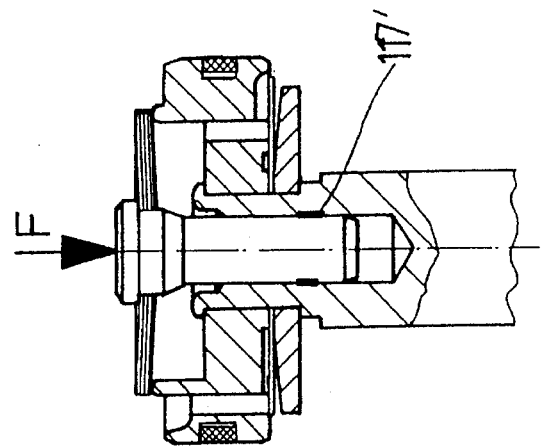
FIG. 15d
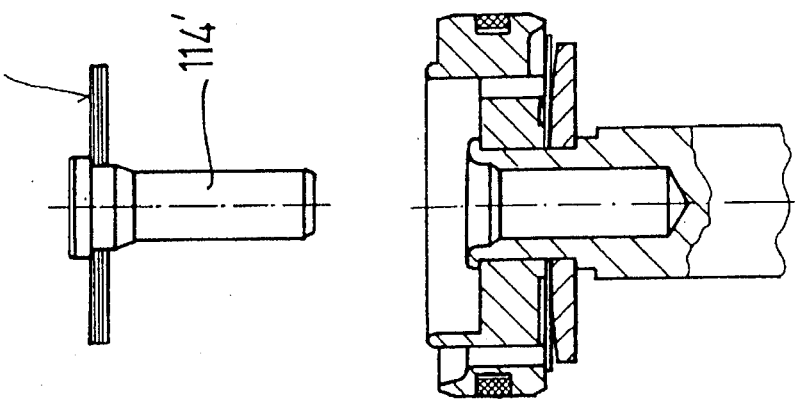
FIG. 15c
FIG. 15b
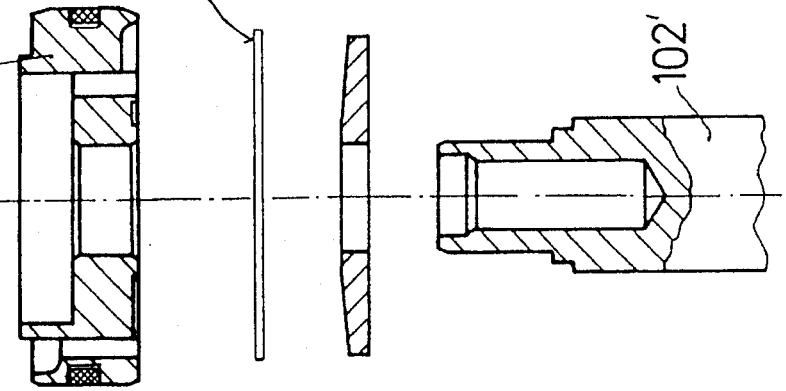
FIG. 15a

AUTOMOBILE SHOCK ABSORBER WITH FREQUENCY-SELECTIVE ACTION

BACKGROUND OF THE INVENTION

1. Field of the Invention

This invention generally relates to an automobile shock absorber with frequency-selective damping action. In general, such a shock absorber might typically have a working cylinder filled with damping fluid, which working cylinder can be divided into two working chambers by a piston. The piston can preferably have throttle valves for controlling flow of fluid between the two working chambers, thereby creating a damping action. The piston can preferably be fastened to a piston rod, and the piston rod can have a fastening device for fastening the piston rod to a portion of the automobile, i.e. the wheel suspension. In addition, the working cylinder can also have a fastening device for mounting the shock absorber to a portion of the automobile, such as the vehicle frame, thereby creating a damping action between the wheel and the frame.

2. Background Information

Some types of shock absorbers having a frequency-selective action are known, such as the shock absorber disclosed by German Laid Open Patent Appln. No. DE-OS 40 29 596. With the shock absorber disclosed thereby, it is possible to provide strong damping in a mechanical manner for the two characteristic natural frequencies of the vehicle body and the vehicle wheels. However, to achieve this damping, single-mass resonators, or oscillators, are provided both in the hollow piston rod and also in a bypass line located parallel to the outer cylinder of the shock absorber. These single-mass resonators each consist of an axially-movable inertial body with elastic connections fastened thereto. The inertial bodies, both in their rest positions and when they make short excursions, allow the flow of fluid from the upper working chamber to the lower working chamber, and block the flow of fluid as soon as they vibrate in resonance. The resonance frequencies of the systems of inertial bodies are tuned to the natural frequencies of the vehicle.

Another type of shock absorber to damp movements is disclosed by German Laid Open Patent Appln. No. 40 24 966, which corresponds to U.S. Pat. No. 5,265,704, in which a dynamic wheel load can be reduced by intervention in the damping element by means of a frequency-dependent increase of the passive stiffness of the suspension element, to modify the dynamic wheel loads in the sense of a reduction.

OBJECT OF THE INVENTION

The object of the present invention is to realize a simple, economical shock absorber for motor vehicles, in which the vibrations in vehicle-relevant frequency ranges can be damped optimally, and in which vehicle vibrations at other frequencies are damped significantly less, without requiring the use of additional devices, such as electronic systems, sensors, etc.

SUMMARY OF THE INVENTION

The present invention teaches that this object can be accomplished by preferably providing the working cylinder with at least two hydraulic capacitances, one of which can preferably be connected to the lower work chamber by means of a hydraulic inductance.

One advantage of this configuration is that the vehicle vibrations are optimally damped in the natural frequency range of both the wheels and the body with passive hydraulic components. The vehicle vibrations at other frequencies are damped significantly less. Thus, a greater level of comfort and performance can be achieved while maintaining safe control of the vehicle, while also providing the advantage that no additional effort or expense is required for sensor systems, electronic components, logic components, plausibility and safety monitoring, e.g. like those required for systems with electronic damping force adjustments. Thus, a less complex, less expensive shock absorber can be provided in accordance with the present invention while providing the necessary damping of the vehicle vibrations.

In an additional embodiment, the present invention also provides that at least one capacitance can preferably be connected to the lower working chamber.

Passive, hydraulic components, e.g. tubular elements, can advantageously be used as carriers of kinetic energy (hydraulic inductances), as hydraulic accumulators or carriers of potential energy (hydraulic capacitances), and as hydraulic resistances or energy consumers. Such components, in the form of a complex hydraulic network, can preferably be sized and connected so that the total effect is to achieve a frequency-selective damping.

In accordance with an additional characteristic feature of the present invention, there can preferably be three hydraulic capacitances corresponding to the working cylinder. It can thereby be advantageous that the upper working chamber is provided with one hydraulic capacitance and the lower working chamber with two hydraulic capacitances.

In another alternative configuration of the invention, at least one of the hydraulic accumulators can preferably be a hydraulic accumulator charged with gas under pressure which acts as the hydraulic capacitance, such a gas could preferably be an inert gas, such as nitrogen.

In an additional embodiment, the capacitance of the upper working chamber can preferably be designed as an axial equalization chamber preloaded with compressed gas and separated from the upper working chamber by a separating piston. One advantage of this configuration is that in theory, the equalization chamber provided in a single-tube gas shock absorber can preferably also be used as the capacitance.

In a further configuration, at least one of the capacitances could also be designed as a mechanical capacitance. The mechanical capacitance in this case can advantageously be an elastic rubber element. Such an elastic rubber element can preferably be configured such that it is compressible under a force, i.e., possibly a foamed rubber element.

In one favorable embodiment, there can also be a flow connection to one of the capacitances, which flow connection can provide the hydraulic inductance. For this purpose, the flow connection can advantageously be designed as a tube or hose line.

In an additional embodiment, the equalization chamber could possibly be located radially. An advantage of this configuration is that the separating piston can then be realized in the form of a ring separating piston.

In one favorable embodiment, at least one capacitance can be configured to coaxially surround the working chamber. An advantage of this configuration is that at least a portion of the partition of the capacitance can then be realized so that it is elastic.

In summary, one aspect of the invention resides broadly in a shock absorber for damping vibrations of a motor vehicle, the shock absorber having a variable damping force for damping vibrations occurring at various vibration frequencies. The shock absorber comprises: a first tubular member, the first tubular member comprising first apparatus for attaching the first tubular member to one of: a wheel suspension and a support structure of the motor vehicle; the first tubular member defining a first chamber therewithin, the first chamber comprising damping fluid therewithin, and the first tubular member defining a longitudinal dimension; piston rod apparatus, the piston rod apparatus having a first end within the first tubular member and a second end external to the first tubular member, the piston rod apparatus being movable within the first tubular member in a direction along the longitudinal dimension of the first tubular member; apparatus for attaching the second end of the piston rod apparatus to the other of: the wheel suspension and the support structure of the motor vehicle; piston apparatus disposed at the first end of the piston rod apparatus, the piston apparatus having a first side disposed adjacent the piston rod apparatus and a second side opposite to the first side, and the piston apparatus dividing the first chamber into a first chamber portion adjacent the first side thereof and a second chamber portion adjacent the second side thereof; the piston apparatus comprising valve apparatus for restricting flow of damping fluid between the first and second chamber portions; and apparatus for varying the damping force of the shock absorber in relation to the vibration frequency. The apparatus for varying comprising: first apparatus for providing hydraulic capacitance, and second apparatus for providing hydraulic capacitance, the first and second apparatus for providing hydraulic capacitance being in fluid communication with the first chamber; and apparatus for providing hydraulic inductance, at least one of the first and second apparatus for providing hydraulic capacitance being connected to the first chamber by the apparatus for providing hydraulic inductance.

Another aspect of the invention resides broadly in a method for making a shock absorber for a motor vehicle, the shock absorber being configured for providing variable damping at varying vibration frequencies of the motor vehicle. The shock absorber comprising: a first tubular member, the first tubular member defining a first chamber therewithin, the first chamber comprising damping fluid therewithin, and the first tubular member defining a longitudinal dimension; piston rod apparatus, the piston rod apparatus having a first end within the first tubular member and a second end external to the first tubular member, the piston rod apparatus being movable within the first tubular member in a direction along the longitudinal dimension of the first tubular member; piston apparatus disposed at the first end of the piston rod apparatus, the piston apparatus having a first side disposed adjacent the piston rod apparatus and a second side opposite to the first sided and the piston apparatus dividing the first chamber into a first chamber portion adjacent the first side thereof and a second chamber portion adjacent the second side thereof; the piston apparatus comprising valve apparatus for restricting flow of damping fluid between the first and second chamber portions; apparatus for varying the damping force of the shock absorber in relation to the vibration frequency, the apparatus for varying comprising: first apparatus for providing hydraulic capacitance, the first apparatus for providing hydraulic capacitance having at least a first cross-sectional dimension and a first length dimension, second apparatus for providing hydraulic capacitance, the second apparatus for providing hydraulic capacitance having at least a second cross-sectional dimension and a second length dimension, and at least one apparatus for providing hydraulic inductance, and the at least one apparatus for providing hydraulic inductance having at least a third cross-sectional dimension and a third length. The method comprising the steps of: providing the first tubular member; attaching the piston apparatus at the first end of the piston rod apparatus; disposing the first end of the piston rod apparatus, with the piston attached thereto, within the first tubular member; determining each of the first cross-sectional dimension, the first length dimension, the second cross-sectional dimension, the second length dimension, the third cross-sectional dimension and the third length dimension, in relationship to one another, to provide variable damping of the shock absorber at at least one predetermined vibration frequency of a motor vehicle;configuring the first apparatus for providing hydraulic capacitance, in accordance with the step of determining, to have the determined first cross-sectional dimension and the determined first length dimension; configuring the second apparatus for providing hydraulic capacitance, in accordance with the step of determining, to have the determined second cross-sectional dimension and the determined second length dimension; configuring the apparatus for providing hydraulic inductance, in accordance with the step of determining, to have the determined third cross-sectional dimension and the determined third length dimension; and connecting the first and second apparatus for providing hydraulic capacitance in fluid communication with the first chamber to form the shock absorber having variable damping at predetermined vibration frequencies of a motor vehicle, the connecting comprising connecting at least one of the first and second hydraulic capacitances to the first chamber by the apparatus for providing hydraulic inductance.

A further aspect of the invention resides broadly in a method for making a shock absorber wherein the step of determining further comprises determing each of the first cross-sectional dimension, the first length dimension, the second cross-sectional dimension, the second length dimension, the third cross-sectional dimension and the third length dimension, in relationship to one another, to provide substantially maximum damping at natural resonating frequencies of both a body of a motor vehicle and wheels of a motor vehicle, and less than maximum damping at frequencies other than the natural resonating frequencies.

A still further aspect of the invention resides broadly in a method for making a shock absorber wherein the natural resonating frequencies comprise a first frequency band ranging from about 0.4 Hz to about 2.0 Hz for a vehicle body and a second frequency band ranging from about 8.8 Hz to about 11.9 Hz for vehicle wheels; and the determining further comprises determing each of the first cross-sectional dimension, the first length dimension, the second cross-sectional dimension, the second length dimension, the third cross-sectional dimension and the third length dimension, in relationship to one another, to provide a damping minimum at a frequency between the first frequency band and the second frequency band, and to provide decreasing damping at increasing frequencies greater than the second frequency band.

BRIEF DESCRIPTION OF THE DRAWINGS

Preferred embodiments of the invention are schematically illustrated in the accompanying drawings, in which:

FIG. 15a–15d show one manner of assembling a piston rod assembly; and

DESCRIPTION OF THE PREFERRED EMBODIMENT

Figure 1:
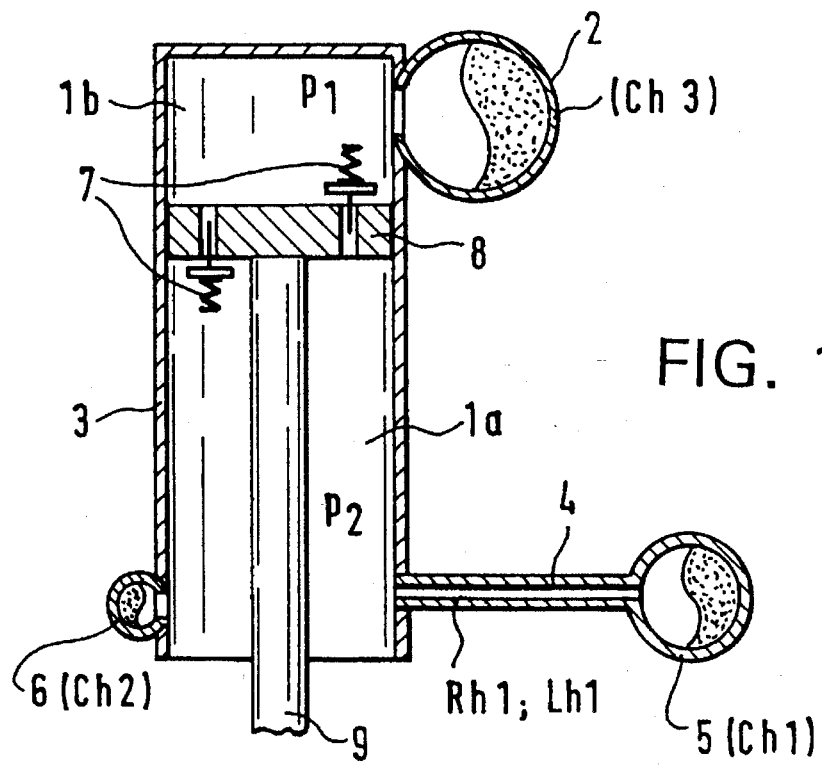
FIG. 1 shows a simplified schematic diagram of a frequency-selective shock absorber.
Figure 1A:
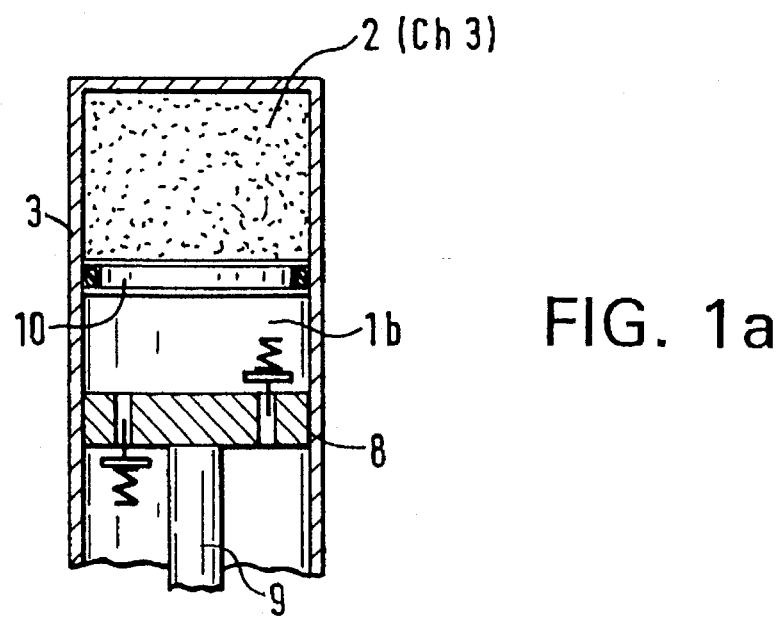
FIGS. 1a and 1b show alternative configurations of capacitance chambers for the shock absorber of FIG. 1.
Figure 5:
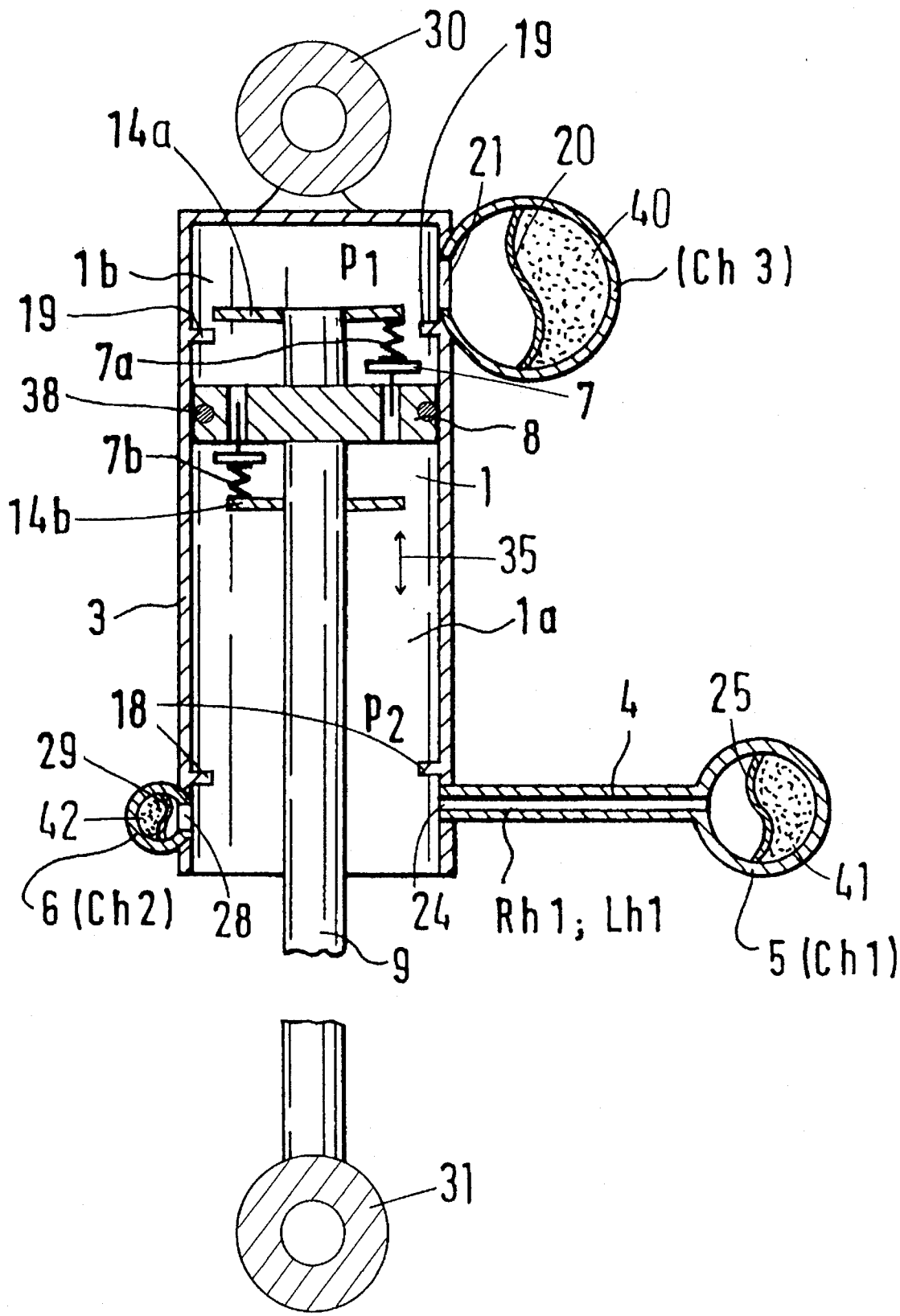
FIG. 5 shows an alternate embodiment of the shock absorber of FIG. 1.

FIG. 1 is a schematic diagram of a simplified shock absorber in accordance with the present invention, while a more complex shock absorber is depicted in FIG. 5. In such a shock absorber as depicted in FIG. 1, the working chamber 1 can preferably be divided into two working chambers 1a and 1b by a piston 8 fastened to a piston rod 9. In hydraulic terms, such a simplified shock absorber can be described as a single-tube gas shock absorber system, in which, as depicted in FIG. 1a, in the upper portion of the working cylinder 3, there can preferably be an equalization chamber 2 filled with gas. This equalization chamber 2 can preferably be separated from the working chamber 1b by means of a separating piston 10. The piston 8 can preferably be equipped with throttle valves 7, which throttle valves 7 can preferably be equipped with real resistances, or resistive impedances to generate the decompression and compression damping.

Referring back to FIG. 1, the lower working chamber 1a can preferably be connected on one hand to a hydraulic accumulator 6 and on the other hands via a flow connection 4, to a hydraulic accumulator 5.

Figure 2:
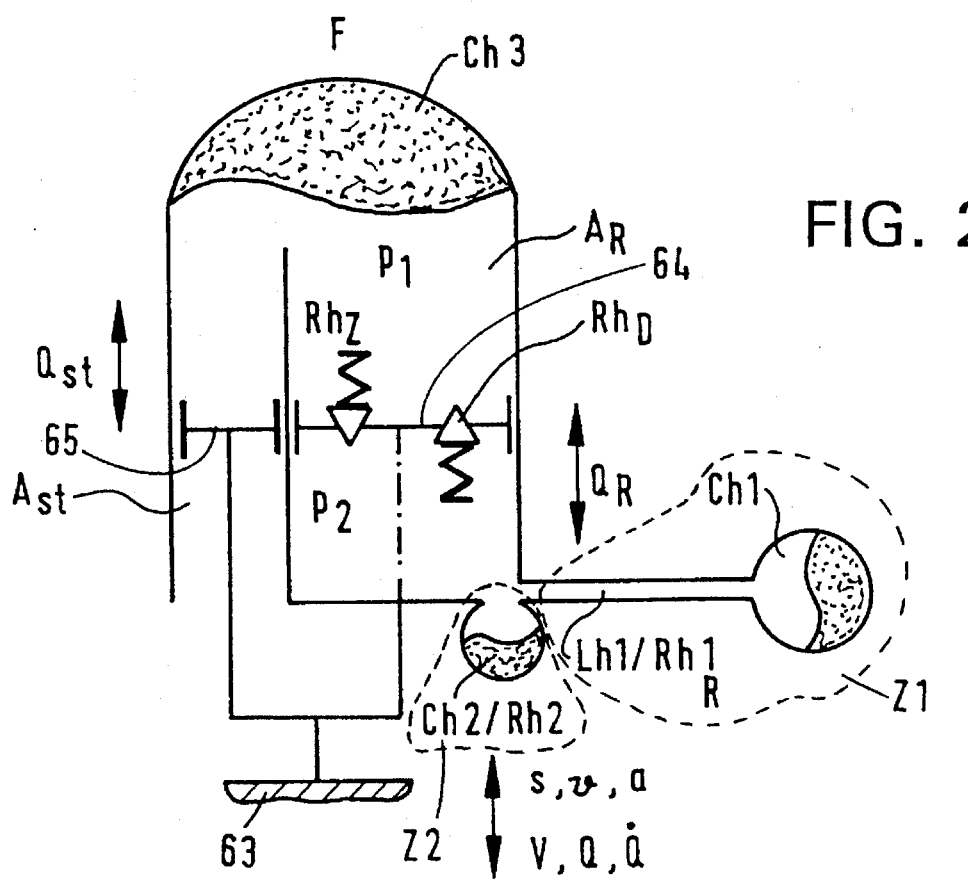
FIG. 2 shows a schematic diagram of the operation of the shock absorber illustrated in FIG. 1.

In one embodiment of the present invention, the working chamber 1 could be provided with at least two hydraulic accumulators, for example, accumulators 2 and 5. The hydraulic accumulator 5 can preferably be disposed on the piston rod side of the piston 8, and the hydraulic accumulator 2 can preferably be disposed on the opposite side of the piston. These hydraulic accumulators 2 and 5, thereby can respectively provide capacitances (Ch3) and (Ch1). Alternatively, additional hydraulic accumulators, such as hydraulic accumulator 6 could preferably be provided, as needed, to provide an appropriate damping action of the shock absorber. The additional hydraulic accumulator 6 can provide a capacitance (Ch2). As discussed above, the hydraulic accumulator 5 could preferably be connected to the chamber 1a via the flow connection 4, which could preferably be a hose, or tube. This flow connection 4 can preferably be configured to provide a hydraulic inductance (Lh). Also, as discussed above, the throttle valves 7 can each preferably operate under a resistance to opening, thereby, as shown in FIG. 2, providing a resistance (RhZ) to decompression, or movement of the piston 8 away from chamber 2, and a resistance (RhD) to compression, or movement of the piston 8 towards the chamber 2.

The entire hydraulic system, as shown in FIG. 1, thus preferably includes the capacitances (Ch1) provided by hydraulic accumulator 5, (Ch2) provided by hydraulic accumulator 6, and (Ch3) provided by hydraulic accumulator 2, an inductance (Lh) provided by flow connection 4, and the hydraulic resistances (RhZ) and (RhD) provided by the throttle valves 7 integrated into the piston 8. By analogy to electronic terminology, such a hydraulic system can be considered to form a hydraulic network.

Figure 1B:
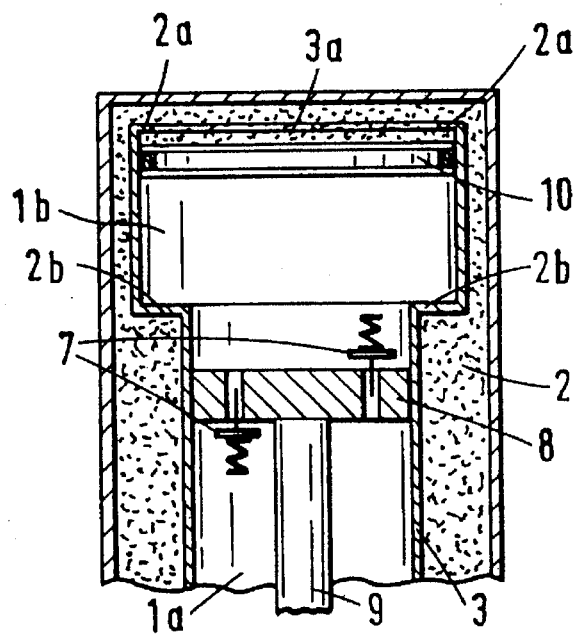

As an alternative to the embodiment of the chamber 2 depicted by FIG. 1a, the chamber 2 could also be formed substantially surrounding the working chamber 1, or preferably concentric to the chamber 1, as shown in FIG. 1b. In this embodiment, the chamber 1b can preferably be provided with an area having a greater diameter than the diameter forming the chamber 1a. By providing such a greater diameter, a stop 2b is formed for limiting movement of the separating piston 10 within the chamber 1b. In addition, flanges 2a could be provided on the terminal end of the cylinder 3, or opposite to the stops 2b, to preferably provide additional stops for limiting movement of the piston 10 out of the chamber 1b. The terminal end could then have an opening 3a with a diameter slightly less than the diameter of the piston 10, to allow the pressurized gas to preferably flow into and out of the chamber 1b along with movement of the piston 10 within the chamber 1b.

As a still further alternative, the hydraulic accumulator 2 could be provided at a radial position with respect to the chamber 1b, such as is depicted in FIG. 1. Further embodiments of the accumulator chambers will be provided further herebelow.

FIG. 2 is a diagrammatic depiction of the operation of the shock absorber illustrated in FIGS. 1, 1a and 1b. The illustrated shock absorber can essentially be considered to operate in accordance with the following functional principle. Since force (F) is equal to pressure (p) times area (A) to which the force is applied, in the shock absorber system, the total force (F) emitted externally can be considered as resulting from the pressure differences (p2–p1) and the respective current pressure p1.

$$F(t) = [p1(t) - p2(t)] \cdot A_R + p1(t) \cdot A_{st}$$

In the decompression stage, p2 is greater than p1, and the resultant force would therefore be negative, while in the compression stage p2 is less than p1, as a result of a positive force being applied to the piston 8 via the piston rod 9. In essence, these pressure differences can result from the volume flow caused by the operation of the hydraulic network when there is a relative movement of the piston rod 9 in relation to the working cylinder 3.

In FIG. 2, the remaining depicted components, in at least one possible embodiment of the invention could be as follows: p—pressure; A—area; Rh—resistance; F—force; Lh—inductance; Ch—capacitance; t—time; s—distance; v—velocity (v=ds/dt); a—acceleration (a=dv/dt); V—volume; Q— flow (Q=dV/dt); and Q—change in quantity flow (Q=dQ/dt). In alternative embodiments, other attributes could possibly be assigned to the references of FIG. 2.

The damping forces can preferably be determined by the proportional volume flow which flows through the throttle valves 7 in the decompression and compression stages, respectively. For example, to realize high damping at the vehicle-relevant characteristic resonance frequencies, or frequency bands (natural frequency range of the wheels and body of the vehicle), provision must typically be made for a sufficiently large volume flow through the throttle valves 7 at these frequencies. At other frequencies, correspondingly less volume flow must typically be made available to the throttle valve 7.

The functional principle described above is preferably realized with passive, hydraulic components in connection with a suitable hydraulic circuit technology, which is designated a "network" below. In addition, in considering the following discussion, it should also be understood, in one possible embodiment of the invention, that the capacitance values (Ch) can be a function of the volume (V) and pressure (p):

$$Ch=f(V,p)$$

while the resistance values (Rh) can be a function of the quantity flow (Q) of fluid through the respective passage:

$$Rh=f(Q)$$

Figure 4:
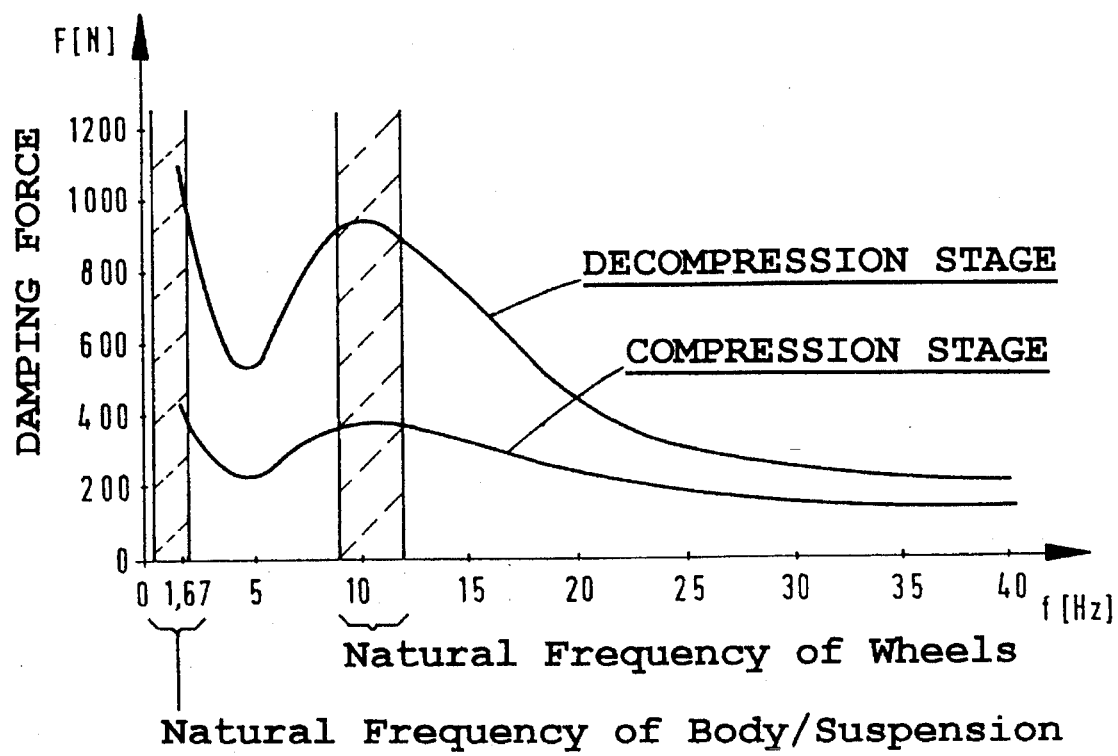
FIG. 4 is a graph indicating the results of measurements taken on the shock absorber illustrated in FIG. 1.

FIG. 4 depicts what could be considered to be natural resonance frequencies of a motor vehicle. As shown in FIG. 4, a motor vehicle can possibly have two resonance bands, with a first resonance band resulting essentially from the vehicle body, or suspension and extending from about 0.4 Hz to about 2.0 Hz, and a second resonance band resulting from the vehicle wheels and extending from about 8.8 Hz to about 11.9 Hz. It should be understood, that the above frequency ranges are meant as exemplary, and the resonance bands could occur at different frequencies for different vehicles, depending on the construction thereof.

Figure 3:
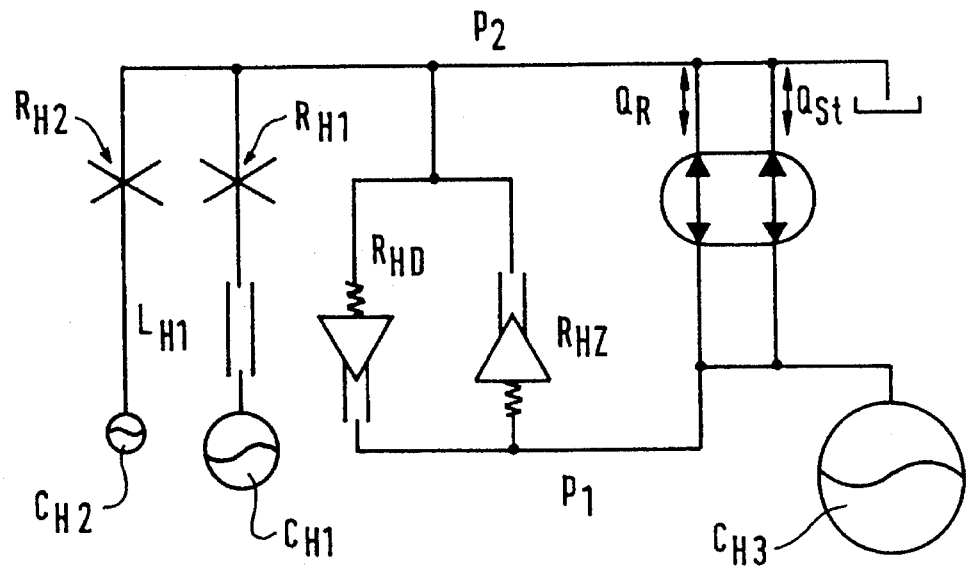
FIG. 3 shows a hydraulic diagram of the configuration illustrated in FIG. 2.

FIG. 2 is a schematic diagram of the operation of the shock absorber illustrated in FIG. 1, while FIG. 3 shows the resulting hydraulic diagram. With reference to FIGS. 2 and 3, the network, in accordance with the present invention can preferably be configured to have at least two characteristic resonance points. Considered in isolation, as shown in FIG. 2, a first resonator, for establishing the first resonance point can be understood as comprising the tube inductance (Lh1), with the capacitance (Ch1) and the pipeline damping, or resistance (Rh1). This first resonator forms a hydraulic series resonant circuit with a frequency-dependent impedance (Z1).

The capacitance (Ch2), with the resistance (Rh2), forms a series impedance (Z2). The impedances (Z1) and (Z2) are connected in parallel and form a parallel resonant circuit, or a second resonator for establishing the second resonance point. The damping resistances (RhZ) and (RhD) are also connected in parallel to the impedances (Z1) and (Z2).

For (Z1), there can preferably be an impedance minimum at the first resonance point, on account of the series connection, and thus at this point, the first resonance point, the greatest possible volume flow preferably occurs through the flow connection 4. In the parallel resonant circuit, there can preferably be an impedance maximum at the second resonance point, and thus the smallest possible volume flow occurs through the flow connection 4. As shown in FIG. 1 and FIG. 4, the components are preferably sized so that the first resonance point lies exactly between the two characteristic resonance frequencies of a motor vehicle. At that point, a maximum flow volume is taken away from the piston 8, because the impedance (Z1) is at a minimum, thereby providing a minimum volume flow through the valves 7, which is equivalent to low damping.

The second resonance point preferably lies in the range of the natural frequency of the wheels. At that second point, on account of the parallel resonance, there is an impedance maximum, where there is minimum flow through connection 4, and essentially a greatest possible volume flow is available to the piston 8 to flow through the valves 7, which in turn leads to maximum damping. With increasing frequency, an inductive reactance (XLh) increasingly blocks the volume flow in the Z1-element, thereby minimizing flow through connection 4, while simultaneously, the capacitive reactance (XCh2) steadily decreases, thereby taking volume flow away from piston 8. Thus, an increasing volume flow is extracted from the piston 8, and the damping force in turn becomes smaller in the range above the natural frequency of the wheels, or in other words, with increasing frequency.

In one possible embodiment of the invention, with reference to FIG. 2, the reference 63 could possibly be indicative of the piston rod 9, whereas the references 64 and 65 could possibly be indicative of the pistons 8 and 10 respectively. As such, any movement of the piston rod 63 could be understood as having a corresponding effect on each of the pistons 64 and 65. The value $A_R$ could then possibly be the cross-sectional area of the piston 64, or, in terms of FIG. 1, the chamber 1a within which the piston 8 moves, and the value $A_{st}$ could possibly be the cross-sectional area of the piston 65, or, in terms of FIG. 1, the cross-sectional area of the chamber portion of chamber 1b which houses the piston 10. Likewise, $Q_{st}$ and $Q_R$ could then possibly be the flow within the corresponding chambers.

FIG. 4, taken in conjunction with the following Table I, shows the results of measurements conducted on a prototype, taken with a suitable hydraulic ram. The damping forces are shown in linear fashion over the frequency at a constant test speed of 0.52 m/s. The results clearly show a damping maxima is achieved in the two characteristic natural frequency ranges, while a damping minimum results between the two natural frequency ranges, and decreasing damping occurs with increasing frequency beyond the natural frequency of the wheels.

TABLE I

| Measurement Frequency Hz | Decompression Stage | Compression Stage |
| --- | --- | --- |
| 1.67 | 1100 | 430 |
| 5 | 540 | 230 |
| 10 | 940 | 380 |
| 20 | 450 | 240 |
| 30 | 270 | 160 |
| 40 | 370 | 140 |

A more detailed description of one possible embodiment of the present invention will now be provided with regard to the embodiment as depicted in FIG. 5. In this possible configuration, the hydraulic accumulators are all depicted as being disposed radially to the cylinder 3, which cylinder 3 can preferably be a single cylinder of a single-cylinder shock absorber, or as will be discussed further with reference to FIG. 6, at least one of the cylinders of a multi-cylinder shock absorber. In a single-cylinder shock absorber, a first attachment device 30 could preferably be provided at one end of the cylinder 3, while a second attachment device 31 could preferably be provided at a first end of the piston rod 9. Each attachment device 30, 31 could preferably be configured to be attached to one of: a wheel suspension part of the motor vehicle (not shown), and a frame portion of the motor vehicle (not shown). Thus, during operation of the motor vehicle, the piston 9 can preferably be moved within the cylinder 3 in the directions indicated by arrows 35.

The piston 8 can preferably be attached at the opposite end of the piston rod 9, and can preferably be disposed within the cylinder 3 in the work chamber 1. The piston 8 can preferably have a seal 38 for sealing against the inner surface of the cylinder 3, thereby dividing the chamber 1 into the chamber portions 1a and 1b. In the depicted embodiment, the inner surface of the cylinder 3 could preferably be provided with stop flanges 18 and 19 to limit movement of the piston 8 within the chamber 1, so that the piston would not pass over, and cover the openings 21, 24 and 28 for the hydraulic accumulators 2, 5 and 6, respectively. Alternatively, in another possible embodiment, if desired, the stops 18 and 19 could also possibly be omitted so that the damping characteristics of the shock absorber would significantly change upon passage of the piston over the openings 21, 24 and 28.

The piston 8 can preferably have damping valves 7 for limiting passage of fluid between the chambers 1a and 1b. In one possible embodiment of the invention, the damping valves 7 could be provided with biasing devices, such as springs 7a and 7b, although other types of biasing devices could also be utilized.

These biasing devices 7a and 7b, in conjunction with piston extensions 14a and 14b could preferably provide a force against which the valves 7 must push in order to open, thus providing a resistive impedance, as mentioned above with reference to FIG. 1. The resistance (RhZ and RhD) of the biasing devices 7a and 7b to opening of the valves 7 could conceivably be altered in accordance with the present invention to provide an appropriate damping force for the shock absorber. An increased resistance would decrease the flow across the piston, and lower the damping force generated. In some embodiments, it might even be preferred that no such biasing devices 7a and 7b be provided, and that the only resistive forces for the opening of the valves 7 be the pressure differences of p1 and p2, thereby increasing the generated damping force. In general, it is submitted that the variation of the resistance of the biasing devices 7a and 7b would be within the skill of the artisan, and for a particular shock absorber configuration could be determined without undue experimentation.

In addition to the resistance values (RhZ) and (RhD), as discussed above, there are other factors which conceivably could essentially also affect the operational damping characteristics of the shock absorber. Some of these additional factors which could essentially need to optimized, in various alternative embodiments of the present invention, to provide essentially optimized damping characteristics, could include the following: the configuration (cross-sectional dimensions, volume, shape, etc.) of the hydraulic accumulators 2, 5 and 6, the cross-sectional area of the openings 21, 24 and 28, the pressure of the gas cushions 40, 41 and 42, and the length and internal diameter, or cross-sectional area of the flow connection 4.

In various possible embodiments of the present invention, the hydraulic accumulators 2, 5 and 6 could each be configured as the chamber-piston arrangement (2,10) as depicted in FIGS. 1a or 1b. Alternatively, instead of a gas cushion 40, 41 and 42, one, two, or possibly all of the hydraulic accumulators could have a mechanical capacitance, such as might be provided by a compressible rubber, such as a foamed rubber, which could also be indicated in FIG. 5 by the designations 40, 41, and 42. Alternatively, instead of a piston 10, as shown in FIGS. 1a and 1b, the hydraulic accumulators could be provided with an elastic membrane 20, 25 and 29, as depicted in FIG. 5, to thereby separate the damping fluid from the gas.

In essence, of the variables as discussed above, the dimensions, and volume of the hydraulic accumulators 2, 5 and 6, the cross-sectional area of the openings 21, 24 and 28, and the amount or pressure of the gas in the gas cushions 40, 41 and 42 can be contributing factors in determining the capacitance values (Ch1), (Ch2) and (Ch3).

In general, capacitance can essentially be summarized as the ability to store energy. In accordance with the present invention, the ability for a chamber to store energy could be directly related to the compressibility of the gas disposed within the chamber, i.e., when fluid is pushed into the chamber, the gas compresses, or increases in pressure, thereby storing an expansion force, so that when the fluid can again leave the chamber, the gas can expand, by means of the stored force and push the fluid out. The compressibility of the gas within a particular chamber can then, in essence, be dependent on the amount of gas present, which is a function of the volume occupied by the gas and the pressure of the gas in the occupied area, as well as the force which is supplying the compression, which in the present context, can possibly be considered to be the dynamics of the fluid flow into the chamber. In this regard, the dynamics of the fluid flow are limited by the cross-sectional area through which the fluid must pass.

The compressibility of a gas can essentially be considered to be a non-linear function, that is, possibly in a container having substantially parallel side walls, i.e., a cylinder, or box, for example. That is, the more compressed a gas becomes, the greater the pressure force needed to compress the gas even further. Thus, the capacitance of a hydraulic chamber in accordance with the present invention also could be considered to be a non-linear function in a possible embodiment of the present invention wherein the chamber enclosing the gas has substantially parallel side walls. However, some compensation for this non-linear compressibility could be achieved by varying, in one embodiment of the invention, the configuration of the side walls, or the membrane which separates the gas from the fluid. For example, in one embodiment of the invention, the chamber containing the gas could be configured to have a substantially inverted conical shape, with a separating membrane which, at first, is stiffer, and more difficult to deform, but becomes easier to deform as the membrane moves away from the internal conical surfaces and has a larger exposed surface area to the fluid pressure.

In view of the above discussed concepts, in making a shock absorber having capacitance chambers in accordance with the present invention, one can experimentally determine the dimensions needed for a hydraulic capacitance chamber, as well as the volume of the chamber, the volume of gas within the chamber, and the pressure of the gas within the chamber. For increasing the capacitance without changing the dimensions of a chamber, one could possibly increase the volume of the gas in the chamber while maintaining the gas pressure constant. Alternatively, one could also possibly decrease the pressure of the gas while maintaining the volume constant. One could also experiment with chamber dimensions in relation to the amount of gas present therein, as a larger chamber could be configured to have a greater capacitance than a smaller chamber at equal gas pressures, and equal ratios of gas volume to chamber volume. Thus, in making a shock absorber in accordance with the present invention, one could set up a series of experimental devices having changeable parameters as discussed above, and then test a shock absorber configuration at various parameters until optimum capacitance values were obtained.

In addition to the above, the inductance and resistance of the flow connection 4 could also be experimentally determined for a particular shock absorber configuration. In essence, inductance can be related to the mechanical concept of inertia wherein a body at rest or in motion will stay at rest or in motion unless acted upon by another force, while resistance would be resistance to flow of fluid. In view of the present invention and the hydraulic inductance disclosed therein, once the fluid is set in motion in a direction within the tube 4, i.e., a pressure by the piston to push the fluid through the tube, the fluid will stay in motion in that direction within the tube until acted upon by another force, i.e., a suction created by the piston to reverse the flow and pull the fluid back out of the tube. The greater the diameter of the tube, and the shorter the length of the tube, the greater the flow reversal effect will be, or, in other words, the ability to change the flow direction will be greater. However, as the diameter is decreased, the flow direction of the fluid becomes more difficult to reverse. Also, as the length is increased, the flow direction becomes more difficult to reverse. With increasing reversal frequencies being generated by an outside force, a resonating frequency could possibly be reached by the outside force, wherein, for particular tube dimensions, the fluid within the tube would actually remain in an essentially unmoving, or anti-resonating, state. For various tube dimensions, this actual resonance frequency would also vary, i.e., the narrower the diameter and/or the longer the tube, taken into consideration with the capacitance attached to the tube, the greater the resonance frequency would be in attaining this substantially unmoving fluid state within the tube.

In the context of one possible embodiment of the present invention, this unmoving state essentially could make the shock absorber function as if the tube and the capacitance connected thereto were not even present, thus providing maximum flow availability to the valves of the working piston 8, and minimum flow through the tube and to the capacitance, as discussed above, to provide the maximum damping force at a particular resonating frequency. Thus, in making a shock absorber in accordance with the present invention, one could set up a series of experimental devices having changeable connection tubes for varying the inductance, capacitance and resistance, as discussed above, and then test a shock absorber configuration with the various connection tubes until optimum inductance and capacitance conditions are obtained.

Thus, while it is generally understood that the size of shock absorbers can vary depending on the intended use thereof, it is submitted that one of skill in the art would be able to determine the dimensions, volumes, pressures, etc. as discussed above, in accordance with the concepts of the present invention to provide a shock absorber having a frequency selective action. In this regard, as discussed above, one could possibly set up a series of experiments for a particular size of shock absorber, in which some, or possibly all of the above-mentioned variables could be changed in a regulated manner, while monitoring the damping capabilities of the shock absorber as a function of the changed variable. From the experimental results so obtained, one could then determine the necessary configurations to modify, or construct a shock absorber in accordance with the present invention.

In still further detail with regard to the embodiment of FIG. 5, the following proportionality of dimensions are provided for one possible configuration of a shock absorber embodiment in accordance with the present invention. It should be understood that the dimensions as presented herebelow are meant as exemplary only, and that the present invention is not meant as being limited to such specific dimension.

In general, a typical shock absorber could possibly be construed as being about 6 cm in diameter, and could possibly vary within the range of between about 4 to about 10 cm.

As shown in FIG. 5, the three hydraulic accumulators 2, 5 and 6 could be provided as separate chambers, distinct from the working chamber 1, and disposed in fluid communication with the working chamber 1 by means of openings 21, 24 and 28. For simplicity, and size comparison purposes, the chambers could possibly be considered as spheres, while cylindrical chambers would, in essence, be more practical to construct, and the shape and dimensions could be configured as necessary in accordance with the present invention.

In view of the above, in proportion to the diameter of about 6 cm, the opening 21 could possibly be about 11 mm, the opening 24 and diameter of connection 4 could possibly be about 2 mm, and the opening 28 could possibly be about 6 mm, thereby respectively providing cross-sectional flow areas of about 95.03 mm$^2$, about 3.14 mm$^2$ and about 28.27 mm$^2$. The flow connection 4 could possibly be about 6 cm long. Further, as discussed above, if the chambers providing hydraulic accumulators 2, 5 and 6 were possibly configured substantially as spheres, in relation to the 6 cm diameter of the cylinder 3, the chamber for hydraulic accumulator 6 could possibly have a diameter of about 1 cm, the chamber for hydraulic accumulator 5 could possibly have a diameter of about 2.4 cm, and the chamber for hydraulic accumulator 2 could possibly have a diameter of about 3.6 cm, wherein the respective volumes would thus be about 0.52 cm$^3$, about 7.24 cm$^3$ and about 24.43 cm$^3$.

As discussed previously, the above is meant to be exemplary of one possible embodiment of the present invention, while variations on the dimension can be done depending on the size and configuration of the shock absorber. In essence, in some possible embodiments of the present invention, the dimensions listed hereabove could be increased, or decreased, proportionally to one another and to the size of the shock absorber.

Figure 6:
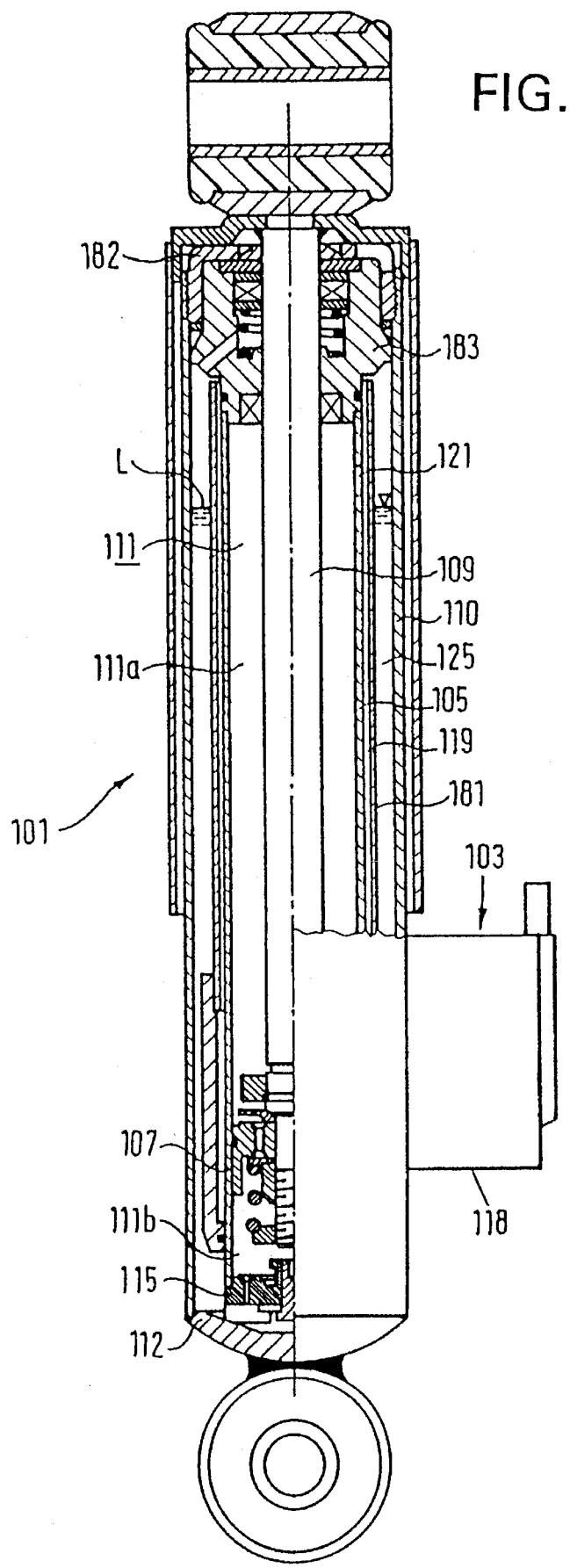
FIG. 6 shows a more detailed view of a typical shock absorber unit for a motor vehicle.

FIG. 6 shows a detailed view of a substantially complete shock absorber unit which could be modified in accordance with the present invention to provide a shock-absorber unit having frequency-selective action. The depicted shock absorber unit of FIG. 6, is meant to be exemplary of a typical shock absorber unit, and it is submitted that modifications thereto could be made in accordance with the present invention by those skilled in the art of designing shock absorber units, without undue experimentation.

The shock absorber unit 101 has a pressure pipe 105 in which a piston 107 on a piston rod 109 divides a working space 111 into an upper or piston-rod-side working chamber 111b. A bottom valve unit 115 closes the pressure pipe 105 at the lower end thereof. A fluid path 119 is formed between the pressure pipe 105 and an intermediate pipe 181, which intermediate pipe 181 can preferably be arranged concentrically with respect to the pressure pipe 105. A connecting orifice 121 in the pressure pipe 105 can be provided to connect the upper working chamber 111a with the fluid path 119. A compensating chamber 125 is confined between the intermediate pipe 181 and a portion of the pressure pipe 105, on the one hand, and the container tube 110 on the other hand. This compensating chamber 125 can be axially limited by a base member 112 and a piston rod guiding and sealing unit 183. The working space 111 is separated by the piston 107 into the upper working chamber 111a and the lower working chamber 111b.

Both the upper and the lower working chamber can preferably be filled with a damping medium, such as a liquid, and the compensating chamber 125 can also be filled with damping liquid up to the level L and can also preferably contain a pressurized gas above the level L. The bottom valve unit 115 can provide communication between the working chamber 111b and the compensating chamber 125. The piston 107 can provide communication between the lower working chamber 111b and the upper working chamber 111a.

According to the illustrative example, the shock absorber unit of FIG. 6, could work as follows: When the piston rod 109 moves upwards, a high flow resistance occurs across the piston 107 and a high pressure is generated in the upper working chamber 111a. Liquid from the upper working chamber 111a flows through the high flow resistance into the lower working chamber 111b. As the piston rod 9 moves outward of the working space 111, the available volume within the working space 111 can increase. Therefore, liquid can flow from the compensating chamber 125 through the bottom valve unit 115 into the lower working chamber 111b. The flow resistance through the bottom valve unit 115 can preferably be small in this phase of operation. The movement of the piston rod 109 with respect to the pressure pipe 105 can be damped.

On inward movement of the piston rod 109 fluid can preferably flow from the lower working chamber 111b through the piston 107 into the upper working chamber 111a. The flow resistance across the piston 107 can be relatively small and the flow resistance across the bottom valve unit 115 can be relatively large. Therefore, a considerable pressure can exist even within the upper working chamber 111a. The volume within the working space 111 is reduced by the piston rod 109 entering into the working space 111. Thus, damping liquid must flow from the lower working chamber 111b through the bottom valve unit 115 into the compensating chamber 125. In this phase of operation the flow resistance through the bottom valve unit 115 can be high, such that a high pressure occurs within the lower working chamber 111b and also within the upper working chamber 111a.

By the connecting orifice 121 and the fluid path 119 the upper working chamber 111a can be connected with the compensating chamber 125 via the valve unit 103, in a known manner. As long as the valve unit 103 is closed, the bypass established by the connecting orifice 121, the fluid path 119 and the valve unit 103 can also be closed. This is the hardest mode of operation of the oscillation damper. When, however, the valve unit 103 is more or less opened, the bypass is also open. As a result thereof the following behavior exists: On upward movement of the piston rod 109 liquid can flow from the highly pressurized upper working chamber 111a not only across the piston 107 providing a high flow resistance but also from the working chamber 111a through the bypass 121, 119, 103 to the compensating chamber 125, thereby reducing the damping force.

When the piston rod 9 moves downwards, there can exist again, a high pressure within the upper working chamber 111a, as described above. Therefore, damping liquid can flow from the upper working chamber 111a through the bypass 121, 119, 103 to the compensating chamber 125. This means that the damping liquid which must be expelled from the working space 111 as a result of the reduced volume therein does not only escape through the bottom valve unit 115 to the compensating chamber 125 but can also partially escape through the bypass 121, 119, 103 to the compensating chamber 125, and the damping force can again be reduced by the open bypass 121, 119, 103.

It is to be noted that the direction of flow of the damping liquid through the bypass 121, 119, 103 can be the same, both on upward movement and downward movement of the piston rod 109 with respect to the pressure pipe 105. By increasing the flow resistance through the valve unit 103 the damping force can be increased both for upward and downward movement of the piston rod 109, and by increasingly opening the valve unit 103 the damping force can be reduced both for upward movement and downward movement of the piston rod 109. It is possible to selectively open and close the valve unit or to continuously vary the flow resistance through the valve unit 103.

As discussed previously, the above-described shock absorber unit of FIG. 6 could be modified in accordance with the present invention, such that, for example, the compensation chamber 125 could be sealed from the working chamber 111, filled with a pressurized gas, and thereby serve as the chamber 2 disposed concentrically about the working chamber 1, such as is illustrated in FIG. 1b. In addition, the bottom valve unit 115, could be replaced by a piston assembly 10, also as depicted in FIG. 1b, to separate the damping liquid within the chamber 111 from the pressurized gas in the chamber 125. Also, instead of an additional valve within the housing 103, the housing 103 could be designed to house the hydraulic accumulator chambers 5 and 6.

Figure 7:
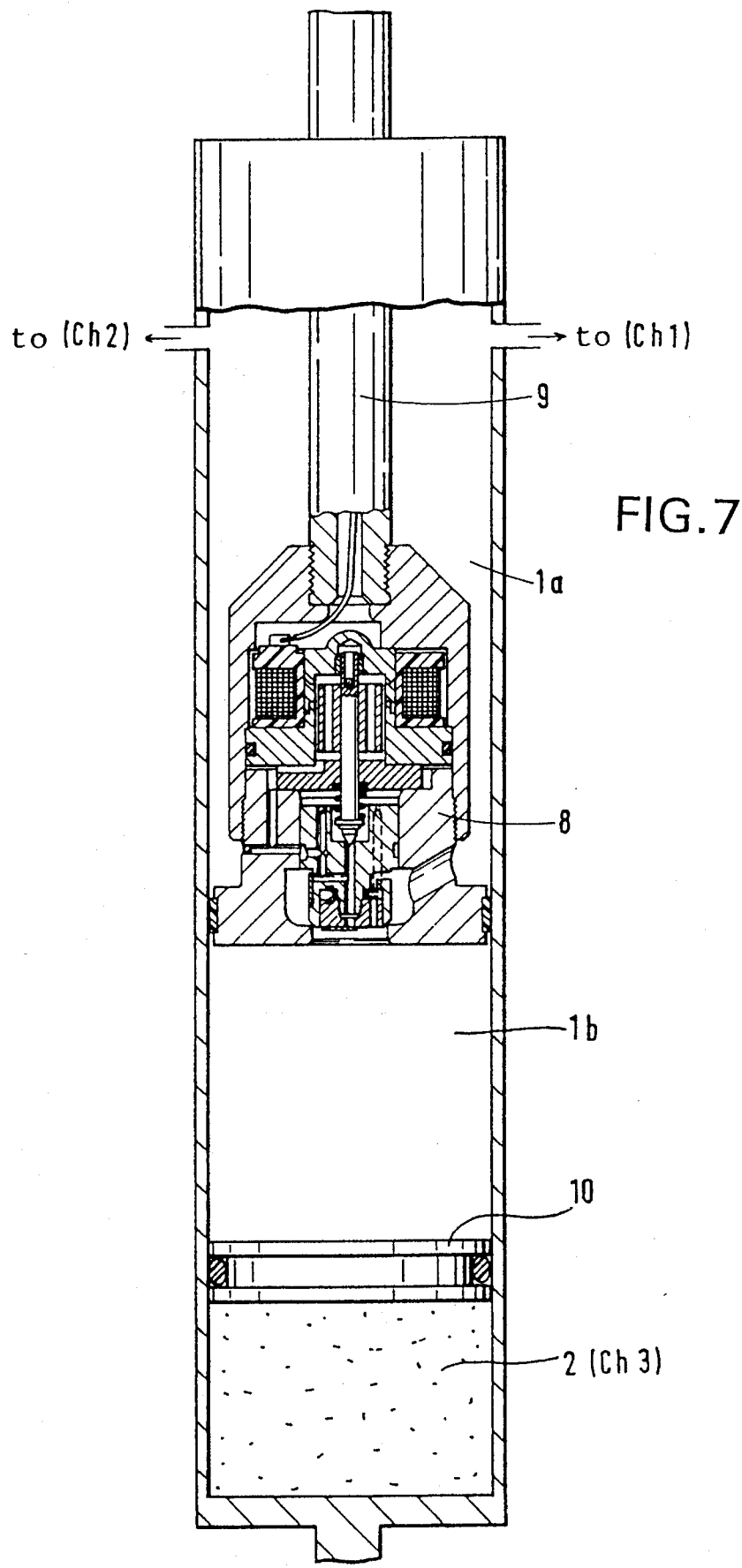
FIG. 7 shows an alternative embodiment of the present invention with an alternative piston assembly.

FIG. 7 depicts one possible embodiment of the present invention, with an alternative possible piston assembly shown in greater detail. The piston assembly shown therein is known from U.S. Pat. No. 5,078,240 to Ackermann and Beck, and is therefore not discussed in any greater detail herein.

Figure 8:
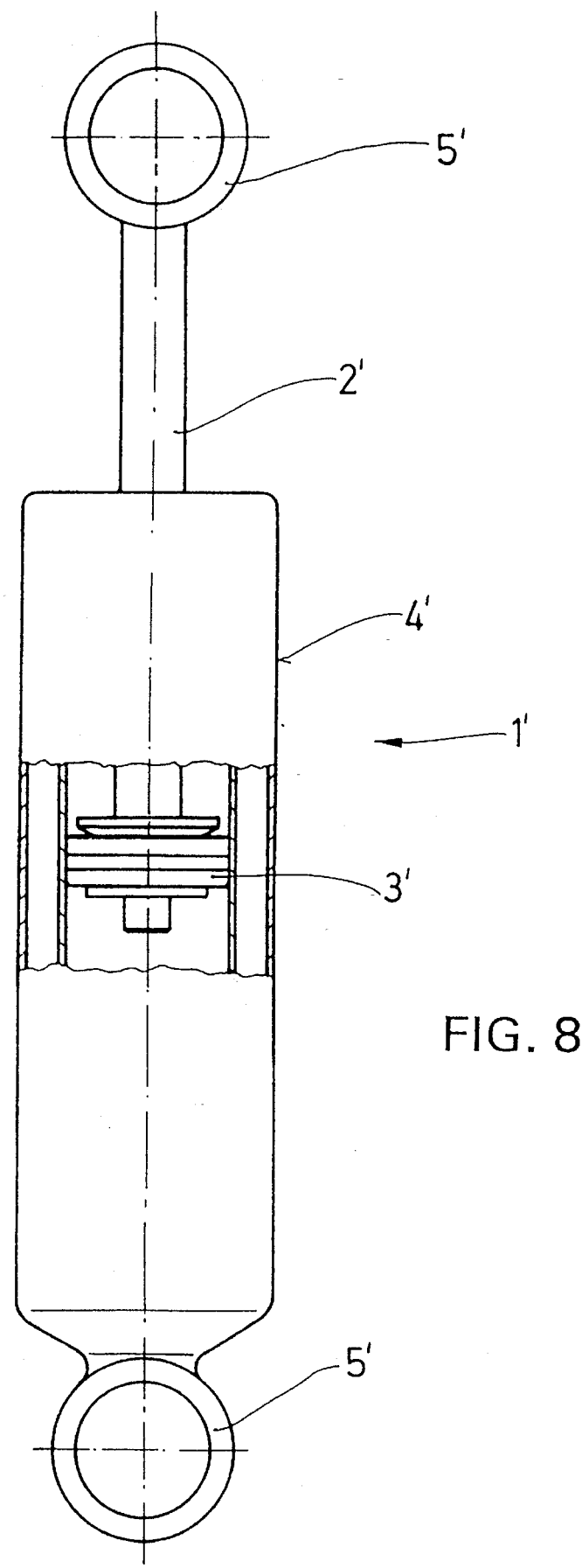
FIG. 8 shows a typical two-tube shock absorber unit.
Figure 9:
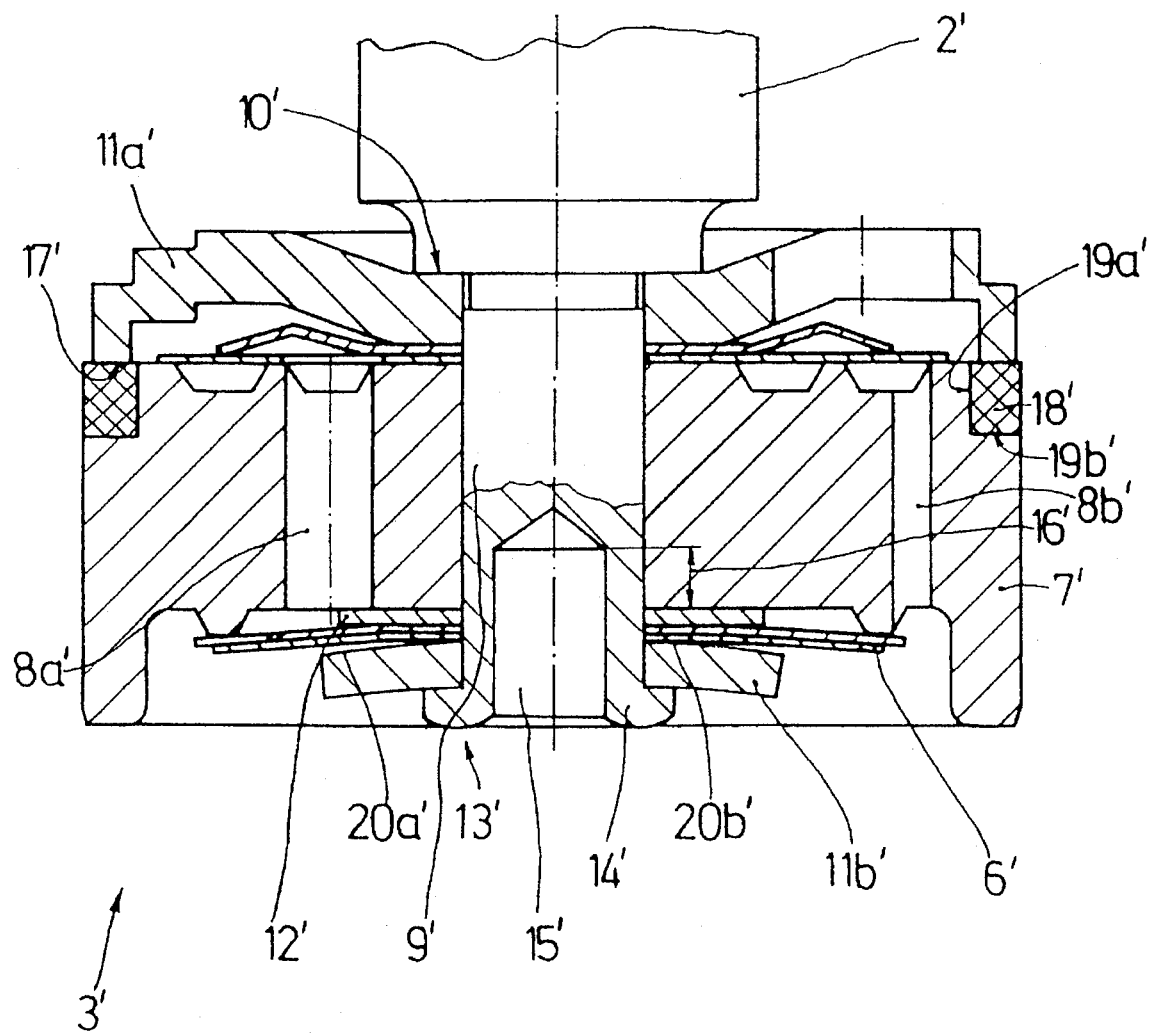
FIGS. 9 and 9a show detailed view of a piston assembly.
Figure 10:
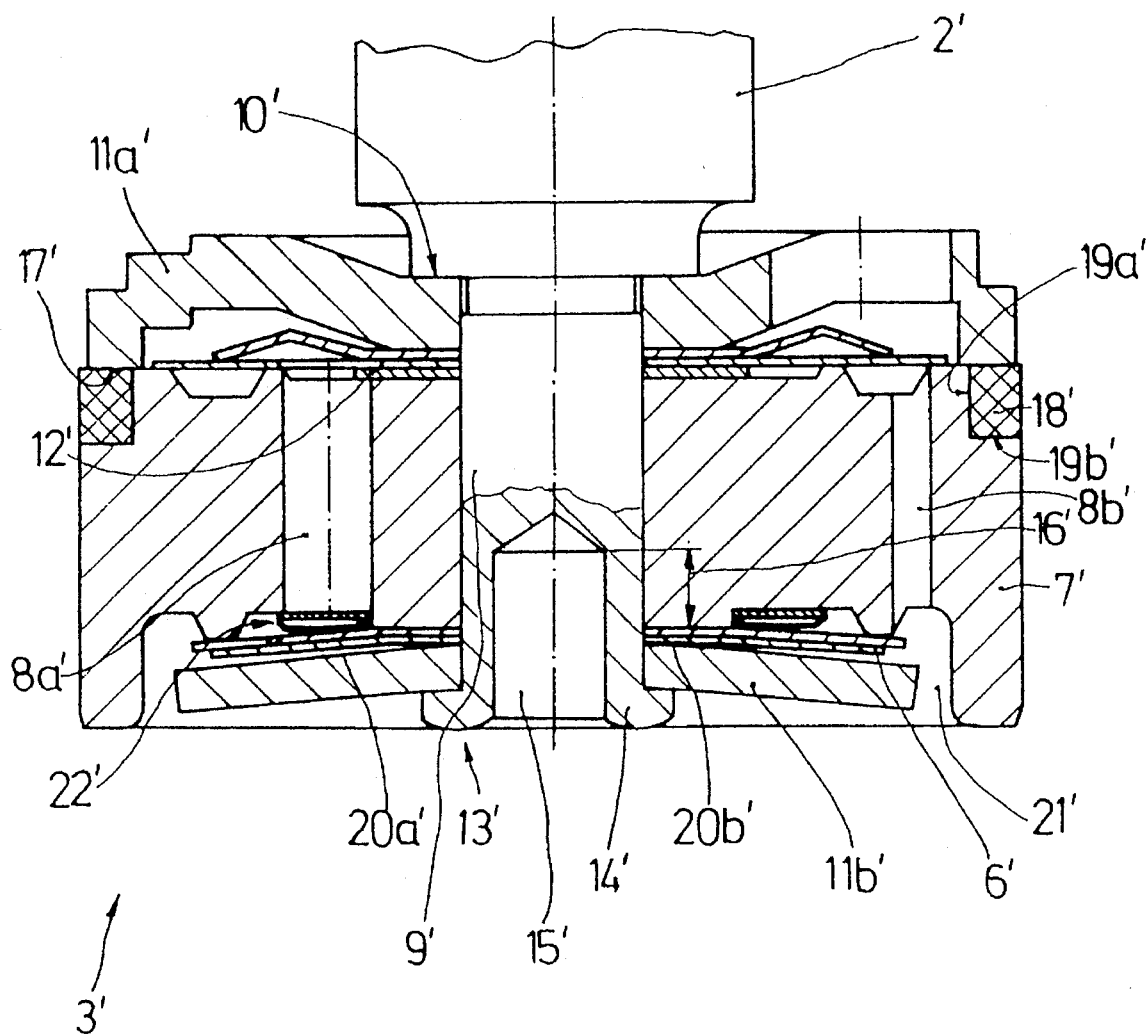
FIGS. 10 and 10a show alternative embodiments of a piston assembly.
Figure 10A:
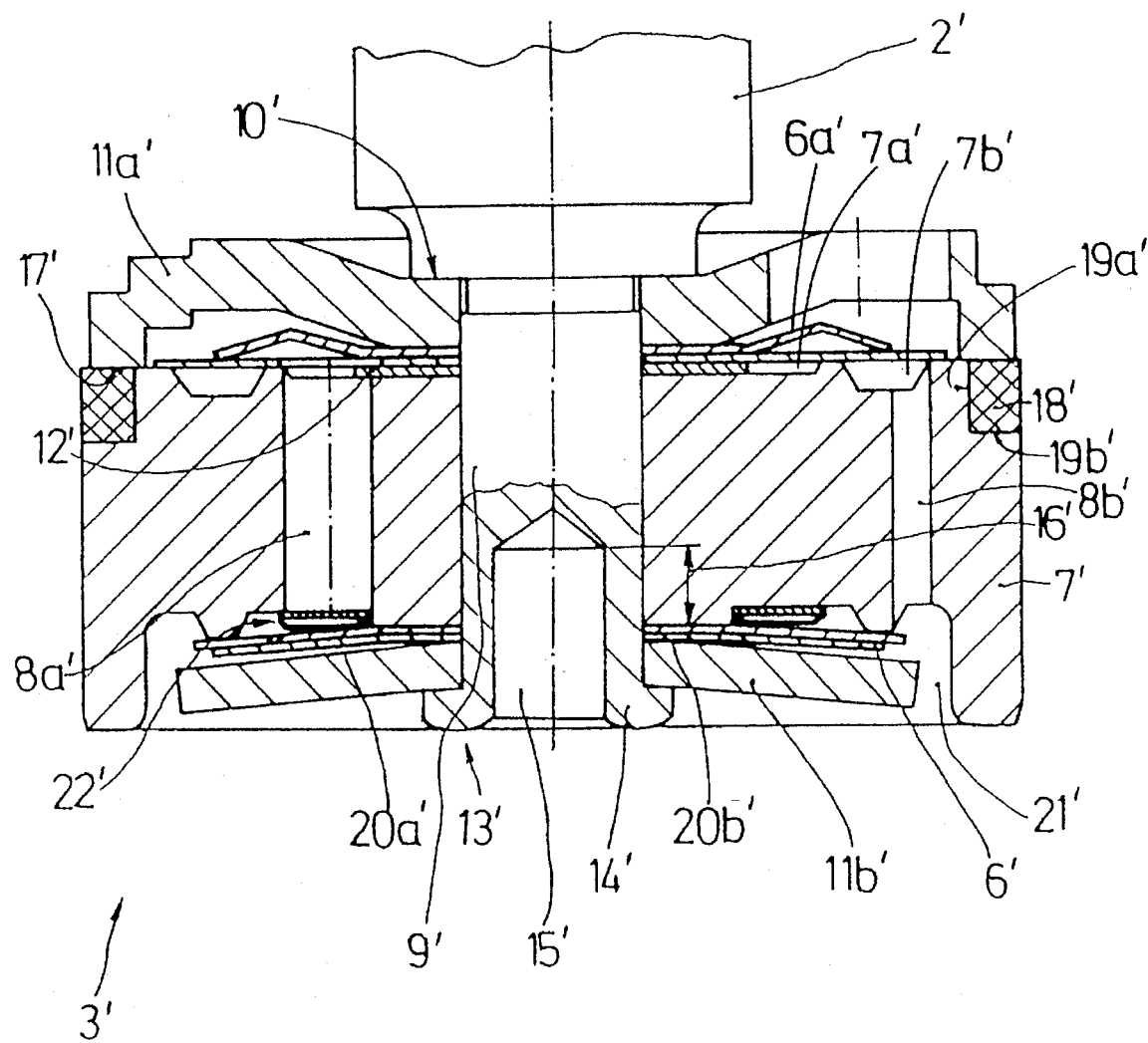

FIGS. 8–10 as discussed herebelow provide further alternative piston assemblies which could possibly be used in conjunction with at least one embodiment of the present invention.

FIG. 8 illustrates a shock absorber which preferably includes an external tube 4', a piston 3' fastened to a piston rod 2', and the fastening devices 5' which are preferably fastened to the piston rod 2' and to the external tube 4'.

The piston 3' illustrated in FIG. 9 essentially includes a valve body 7', which valve body 7' is preferably provided with passages 8a'/8b', one for each direction of flow. The passages 8a'/8b' are preferably covered at their outlet openings by valve discs 6'. Depending on the desired damping force setting, valve disc packets can also be used, whereby valve discs of various thicknesses, graduated diameters or advance opening cross sections can preferably be set inside the packet.

The piston 3' is preferably guided by a journal 9', which journal 9' is a component of the piston rod 2'. A supporting ring 11a' is preferably supported on a shoulder 10' of the piston rod 2', and is adjacent to a series of components consisting of a valve disc packet 6', the valve body 7', a throttle disc 12' and an additional supporting ring 11b'. Preferably by means of a positive fit 13', the piston 3' is fastened to the piston rod 2'.

The fastening of the piston 3' to the piston rod 2' is preferably achieved by means of a bead 14'. For this bead 14', a blind hole 15' is preferably worked into the journal 9'. This blind hole 15' can advantageously have an overlap 16', preferably with the valve body 7'. During the forming process, which forming process can preferably be forging or possibly cold-forging, an additional axial force component is applied, and a compensation of play between the valve body 7' and the journal 9' is thereby achieved by means of bearing forces in the vicinity of the overlap 16', so that the valve body 7' is preferably fixed on all sides.

In other words, as axial force is applied by a suitable tool during forming, the diameter 9a' (see FIG. 9a) of journal 9' is preferably expanded so that any play between the journal 9' and the valve body 7' is substantially decreased, or possibly eliminated. The forming tool is preferably forced into blind hole 15', thereby expanding the walls of journal 9' and simultaneously forming the beads 14'. Thus, the fit between journal 9' and valve body 7' is preferably much tighter than the fit which is typically achieved by a conventional nut arrangement (i.e. a nut threaded onto journal 9'). Thus, any rattles which can be caused by the contact between journal 9' and valve body 7' can preferably be substantially reduced or eliminated. Further, the present invention preferably permits the valve body 7' to be centered on the journal 9' more accurately, since essentially all play between valve body 7' and journal 9' is eliminated.

Generally, during the forming process, the journal 9' will preferably expand substantially equally all around its circumference, thereby grasping the valve body 7' of the piston 3' preferably on all sides. The end result is preferably a "mushroomed" shape.

The supporting rings 11a' and 11b', preferably located inside and outside the row of axially braced components, also each preferably perform an additional function. For example, the supporting ring 11a' preferably has a fastening surface 17' as an additional measure to secure a piston ring 18', which piston ring 18' is preferably guided essentially without undercutting, i.e. in this case by means of two contact surfaces 19a' and 19b' on the valve body 7'. With regard to the supporting ring 11b', it should be noted that the ring 11b' preferably has a rolling contour which can be used to influence the damping force characteristic. In this embodiment, the rolling contour is preferably formed by two essentially conical surfaces 20a'/20b'. As a result of this particular shaping process, the damping force characteristic has a progressive curve in the range of higher flow velocities.

Figure 9A:
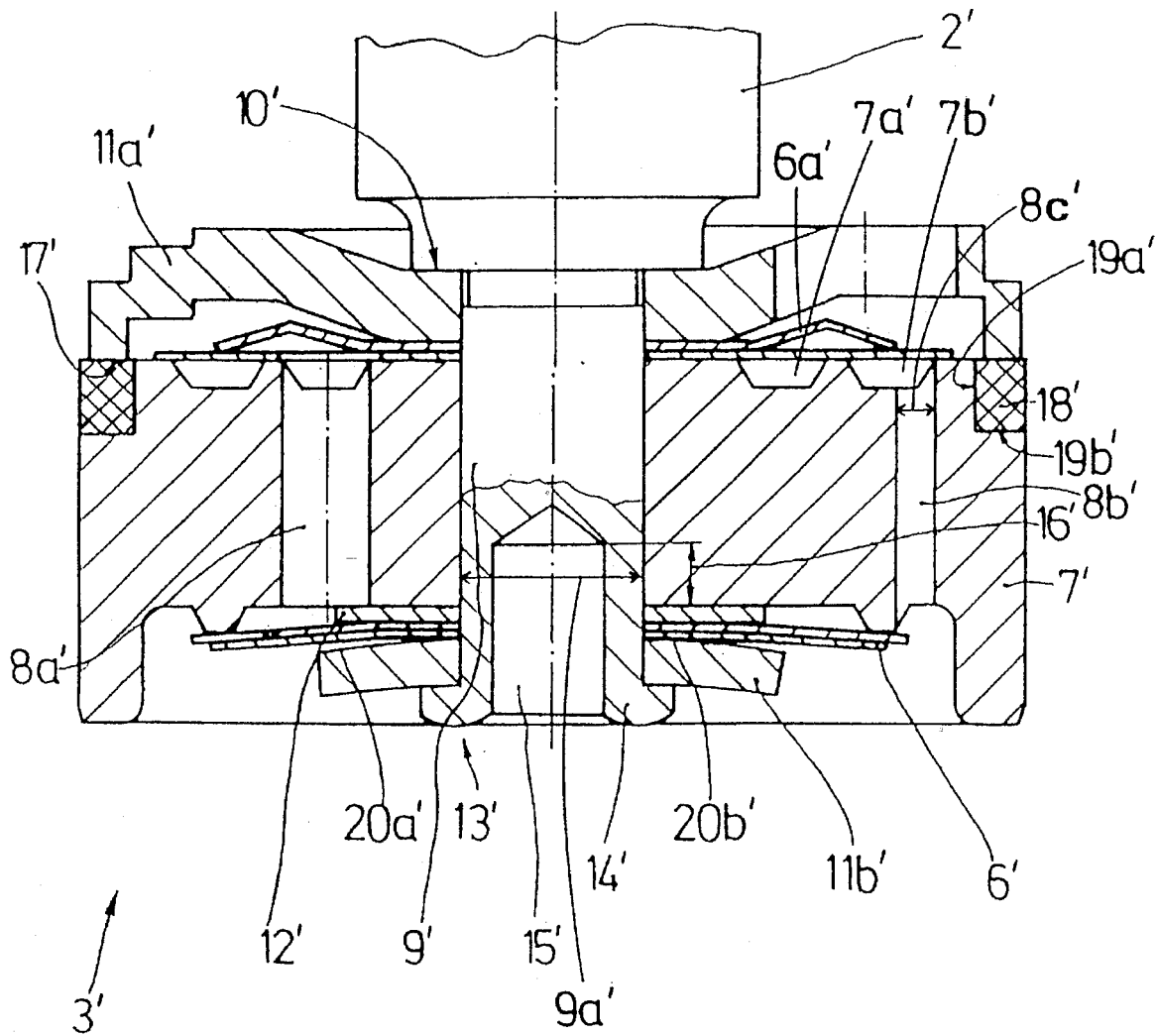

Further, in one preferred embodiment as shown in FIG. 9a, the valve body 7' may have two preferably concentric grooves 7a' and 7b'. The grooves 7a' and 7b' may preferably serve to assist in increasing the pressure force generated by passage 8b', since passage 8b' has a relatively small diameter 8c'. The piston 3' may also include a spring body 6a' or possibly a spring valve.

The embodiment illustrated in FIG. 10 is distinguished from the embodiment illustrated in FIG. 9 in one aspect essentially by the fact that the supporting ring 11a', with its fastening surface 17', is preferably at least partly supported on the end face of the valve body 7'. The fastening surface 17', as well as the contact surfaces 19a' and 19b', preferably form a chamber for the piston ring 18'.

With regard to the piston ring 18', essentially all that needs to be taken into consideration are the contact surface 19a', and the height of the piston ring.

As a variant of the configuration illustrated in FIG. 9, in FIG. 10 the throttle disc 12' is preferably shifted toward the supporting ring 11a'.

Thus, the overlap 16' can be preferably significantly increased while retaining the same depth of the blind hole 15', possibly by relocating the throttle disc 12'.

The supporting ring 11b' is also preferably designed so that the decrease in pressure inside the valve occurs over a longer flow distance. The supporting ring 11b', together with the valve body 7', preferably forms an annular gap 21', so that unpleasant flow noises can be suppressed.

To influence the valve characteristic, a return stop 22', preferably in the form of a spring body with a cover disc, can be used, in particular if only small volumes need to be handled in the compression direction.

Of course, this valve design can also be employed in a bottom valve, such as that the bottom valve shown in FIG. 55 of U.S. Pat. No. 4,650,042 granted to Heinz Knecht et al. on Mar. 17, 1987, and the bottom valve shown in FIG. 1 of U.S. Pat. No. 4,802,561 to Heinz Knecht et al. on Feb. 7, 1989.

Figure 11:
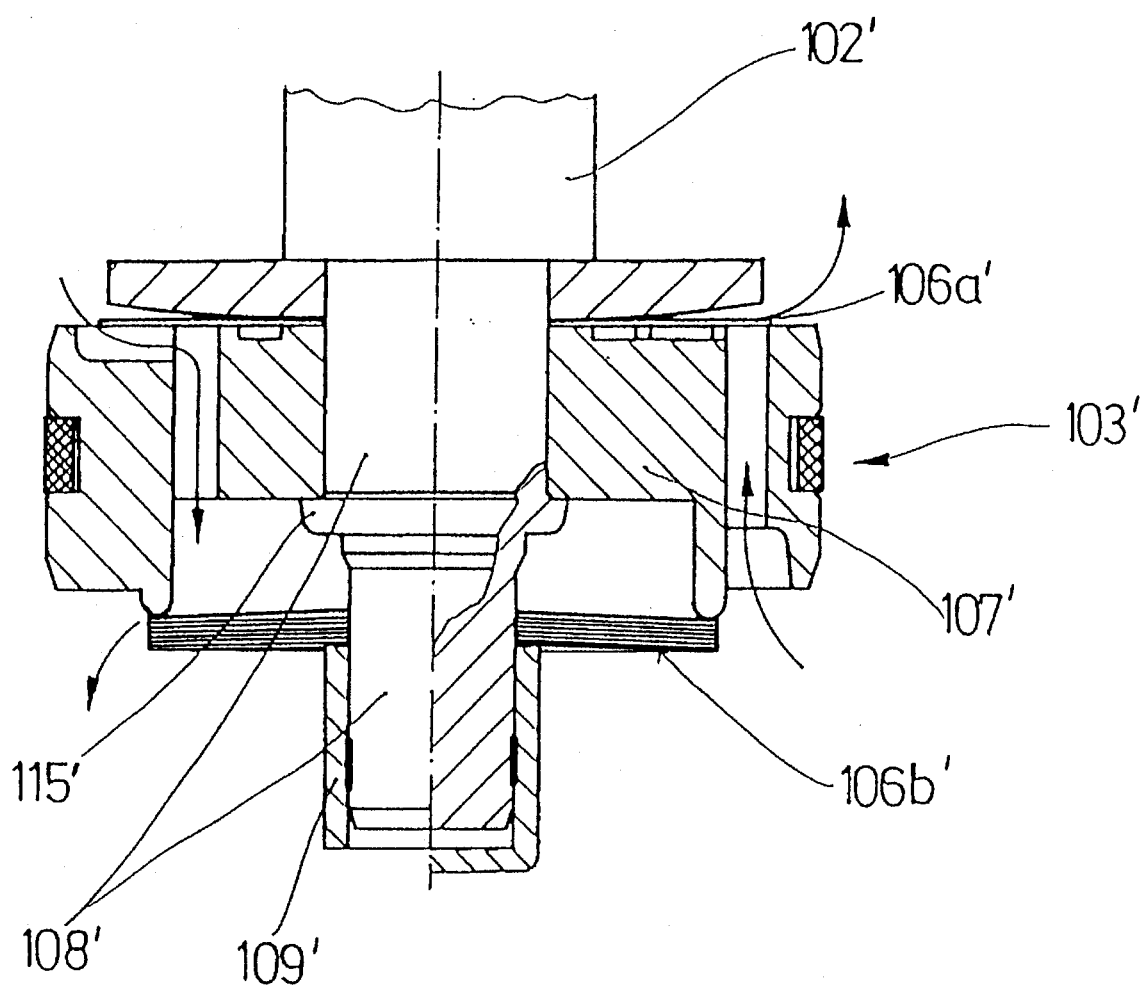
FIGS. 11 and 11a show further alternative embodiments of a piston assembly.

FIG. 11 illustrates one embodiment of a piston 103' in a two-tube shock absorber. In FIG. 11, the piston 103' is illustrated in cross section, whereby on the piston rod 102' there is a preferably cylindrical component 108', which cylindrical component 108' in this embodiment is configured as a journal of the piston rod 102'. The cylindrical component 108' preferably holds, in the axial direction, the valve disc 106a' and the valve body 107'. The fastening element 109' is preferably pushed onto the cylindrical component 108', and an appropriate prestress is applied. After the application of the corresponding prestress, the fastening of the fastening element 109' preferably to the cylindrical component 108' can be accomplished in the form of a weld joint, e.g. by laser welding, in spots or alternatively over the entire circumference. There are two embodiments shown in the lower half of FIGS. 11 and 11a to preferably illustrate an all-around weld seam 109b' and a spot weld 109a'. When an all-around weld seam 109b' is used, the fastening element 109' can preferably be in the form of a sleeve (left half of FIGS. 11 and 11a). If, on the other hand, a spot weld 109a' is used, the fastening element 109' can preferably be in the form of a pot-shaped component (right half of FIGS. 11 and 11a).

Thus, if a spot weld 109a' is employed, the strength of the fastening element may preferably be increased by including a bottom portion 109c'. Thus, the fastening element preferably has the form of a "pot".

Figure 11A:
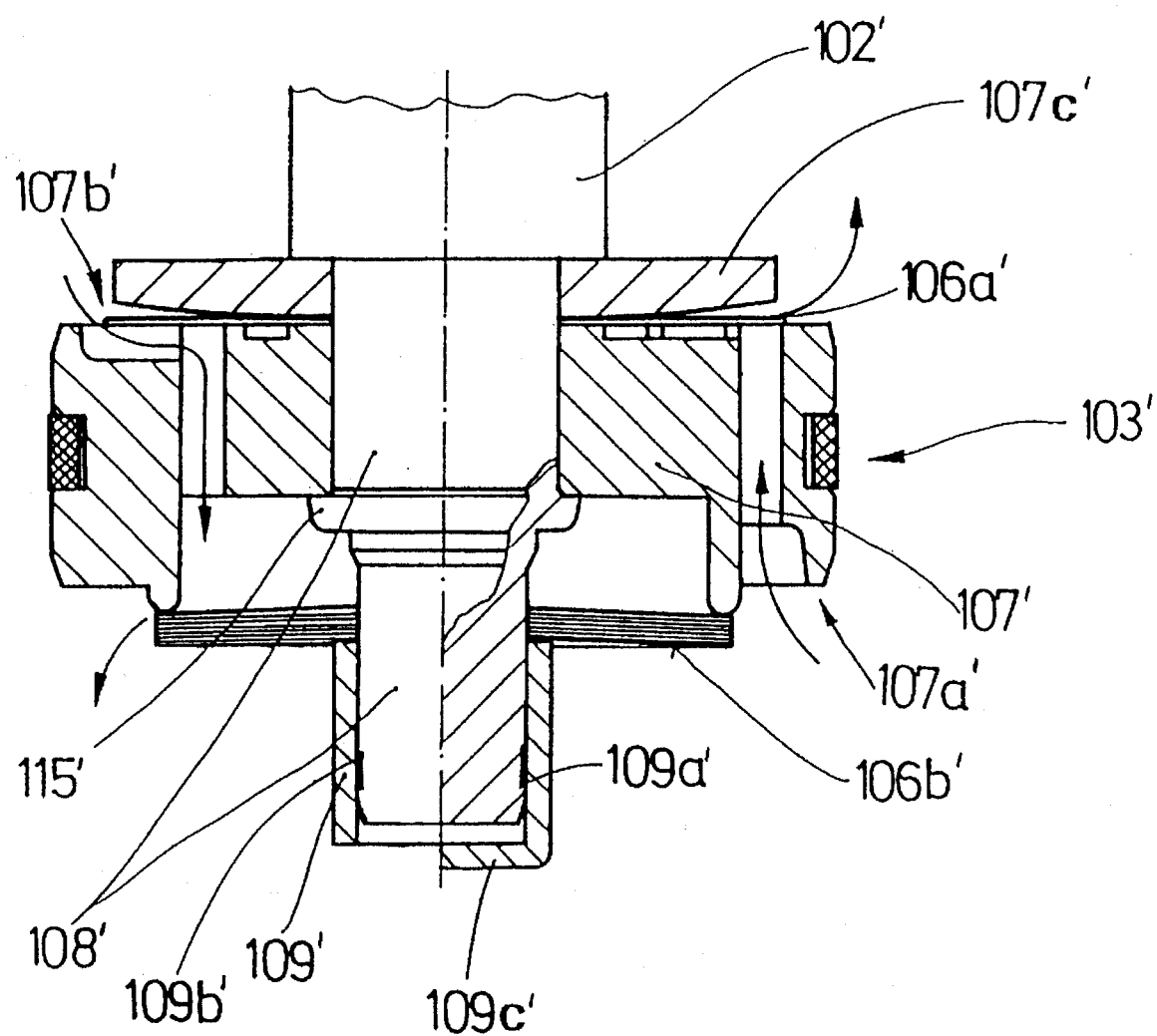

The embodiments illustrated in FIGS. 11 and 11a show that the valve body 107' and the valve discs 106a' are already fastened to the cylindrical component by means of a riveted joint 115'. In an additional assembly step, the valve discs 106b' are preferably prestressed and fastened.

Also shown in FIG. 11a are passages 107a' and 107b', one preferably for each direction of flow. The piston 103', in one embodiment thereof, may also include a valve 107c', which valve may serve to regulate or control the flow through passages 107a' and 107b'. The passages 107a' and 107b', as well as the valve 107c' are well-known in the art and will not be discussed further here.

Figure 12:
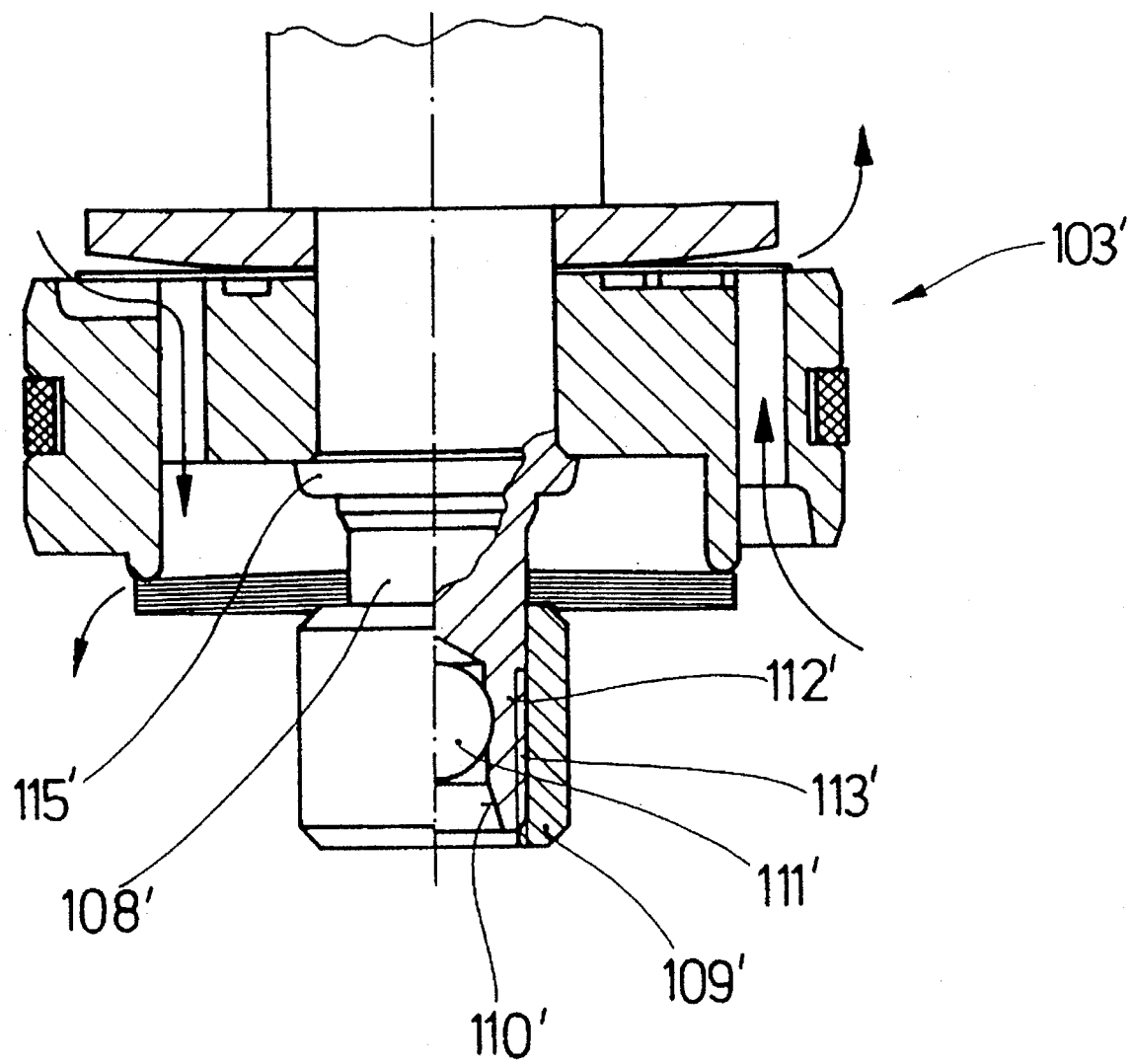
FIGS. 12 and 12a show still further alternative embodiments of a piston assembly.

FIG. 12 illustrates a piston 103' of a shock absorber, in which the cylindrical component 108' is preferably provided with a hole 110'. A sphere can preferably serve as the expander element 111', and is inserted into this hole 110', so that a positive fit is preferably produced by means of the projections 112' and recesses 113', and by the expansion of the cylindrical component 108' preferably as a result of the pressure exerted by the expander element 111'. This spherical closure illustrated in FIG. 11 can also preferably be installed essentially without the generation of any chips which can typically be caused by cutting or machining processes. By means of a corresponding device, or suitable tool, a corresponding pre-stress can be applied to the fastening element 109', whereby the expander element 111', the cylindrical component 108', and the fastening element 109' can then be connected to one another in the respective or desired position. The embodiment illustrated in FIG. 12 is also preferably provided with a riveted joint 115'.

Figure 12A:
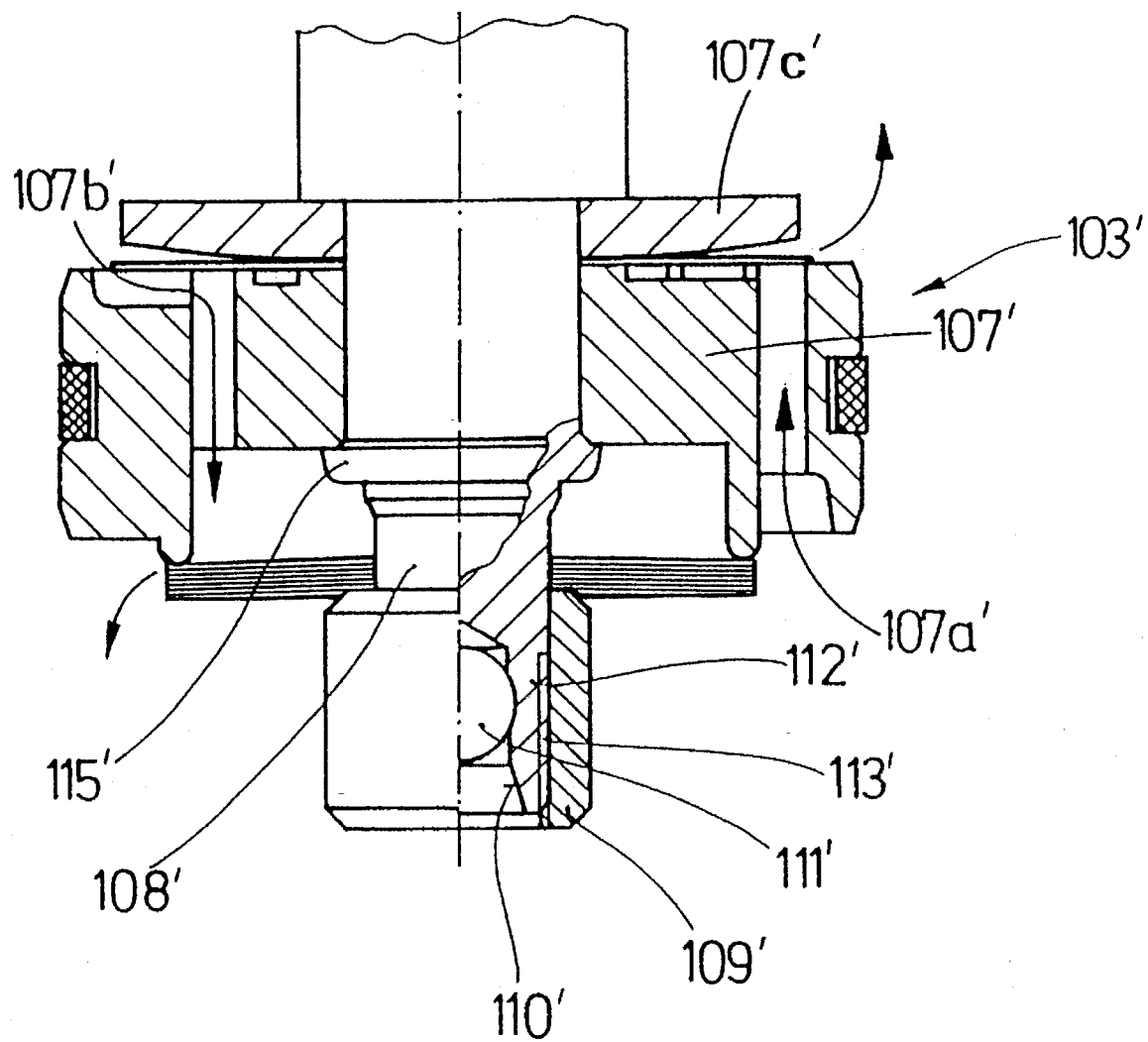

Passages 107a' and 107b' are shown in the embodiment illustrated in FIG. 12a, one passage preferably for each direction of flow. The piston 103', in one embodiment may also have a valve 107c' which valve 107c' can serve to regulate the flow through passages 107a' and 107b'. The passages 107a' and 107b' and the valve 107c' are well known in the art and will not be discussed further here.

Figure 13:
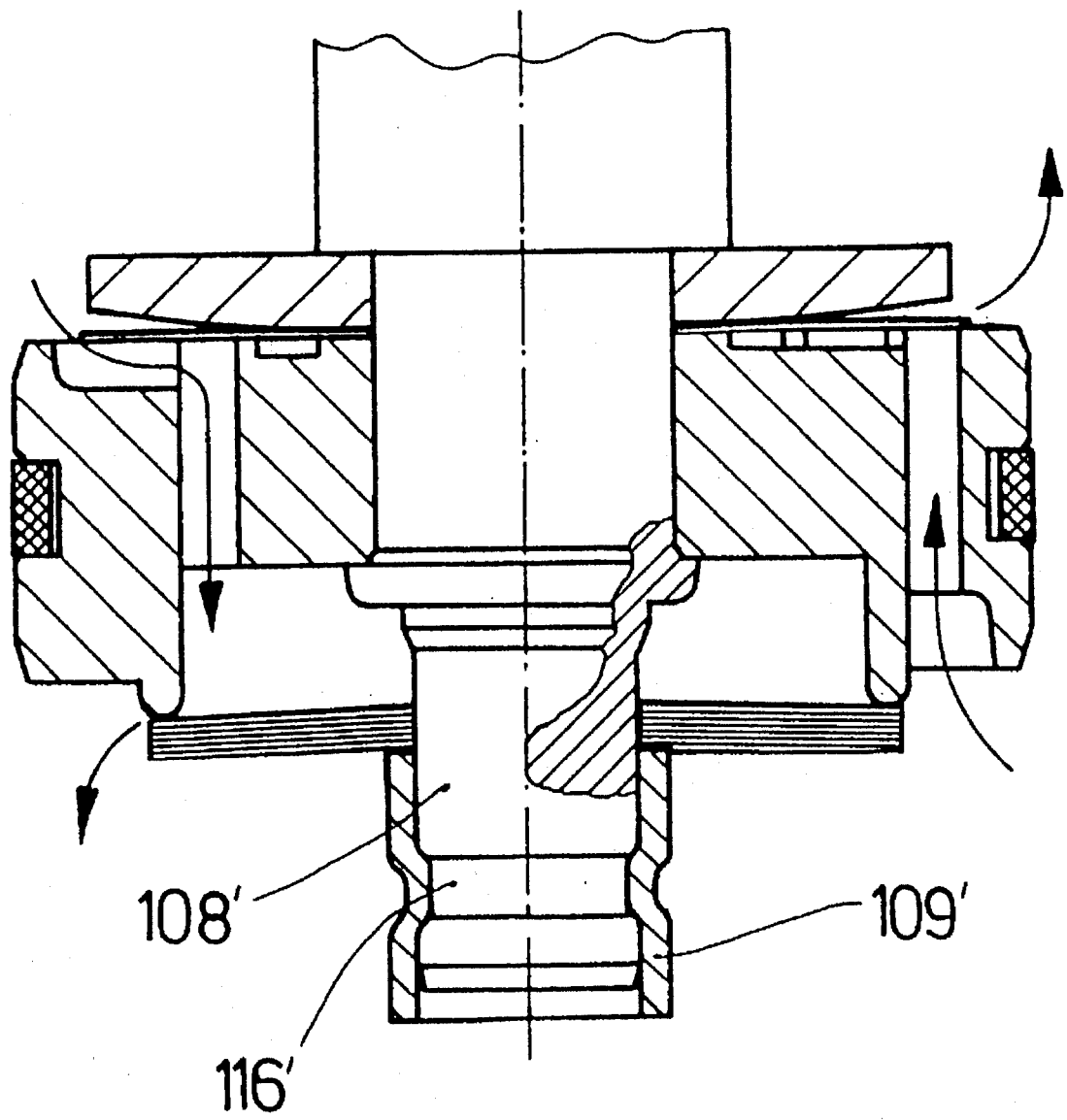
FIGS. 13 and 13a show additional possible embodiments of a piston assembly.

FIG. 13 shows a fastening element 109' preferably made of light metal or light metal alloy, which fastening element 109' has preferably been shrink-fitted in an essentially contactless manner onto the cylindrical component 108'. The groove 116' of the cylindrical component is thereby preferably used to achieve the positive fit.

The type of fastening illustrate in FIG. 13 may also conceivably be accomplished by a compression fitting of fastening element 109' onto cylindrical component 108'. In this type of fastening, a suitable tool can preferably be used to grasp fastening element 109' and by compression, force fastening element 109' onto cylindrical component 108'.

Figure 13A:
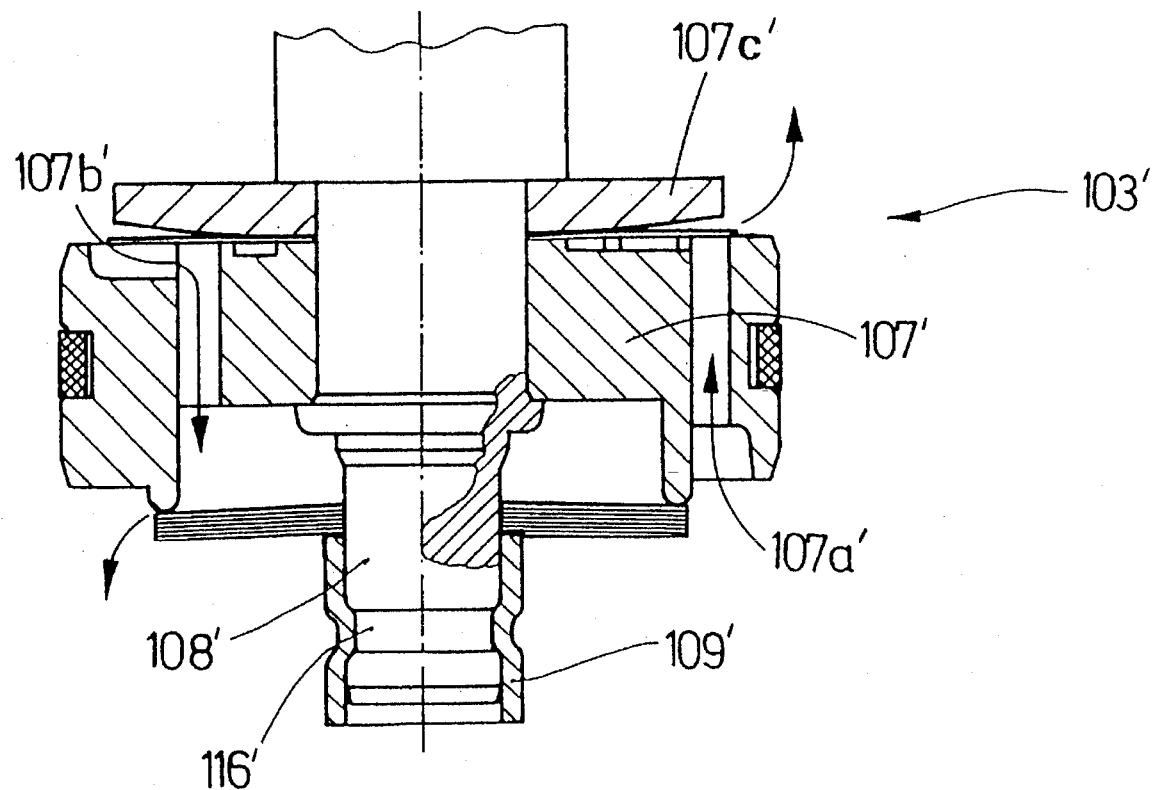

As shown in FIG. 13a, one embodiment of the present invention may include the valve body 107' having passages 107a' and 107b', one preferably for each direction of flow. The piston 103' may also include a valve 107c' which valve 107c' can preferably serve to regulate or control the flow through passages 107a' and 107b'. The passages 107a' and 107b', and valve 107c' are well known in the art and will not be discussed further here.

Figure 14:
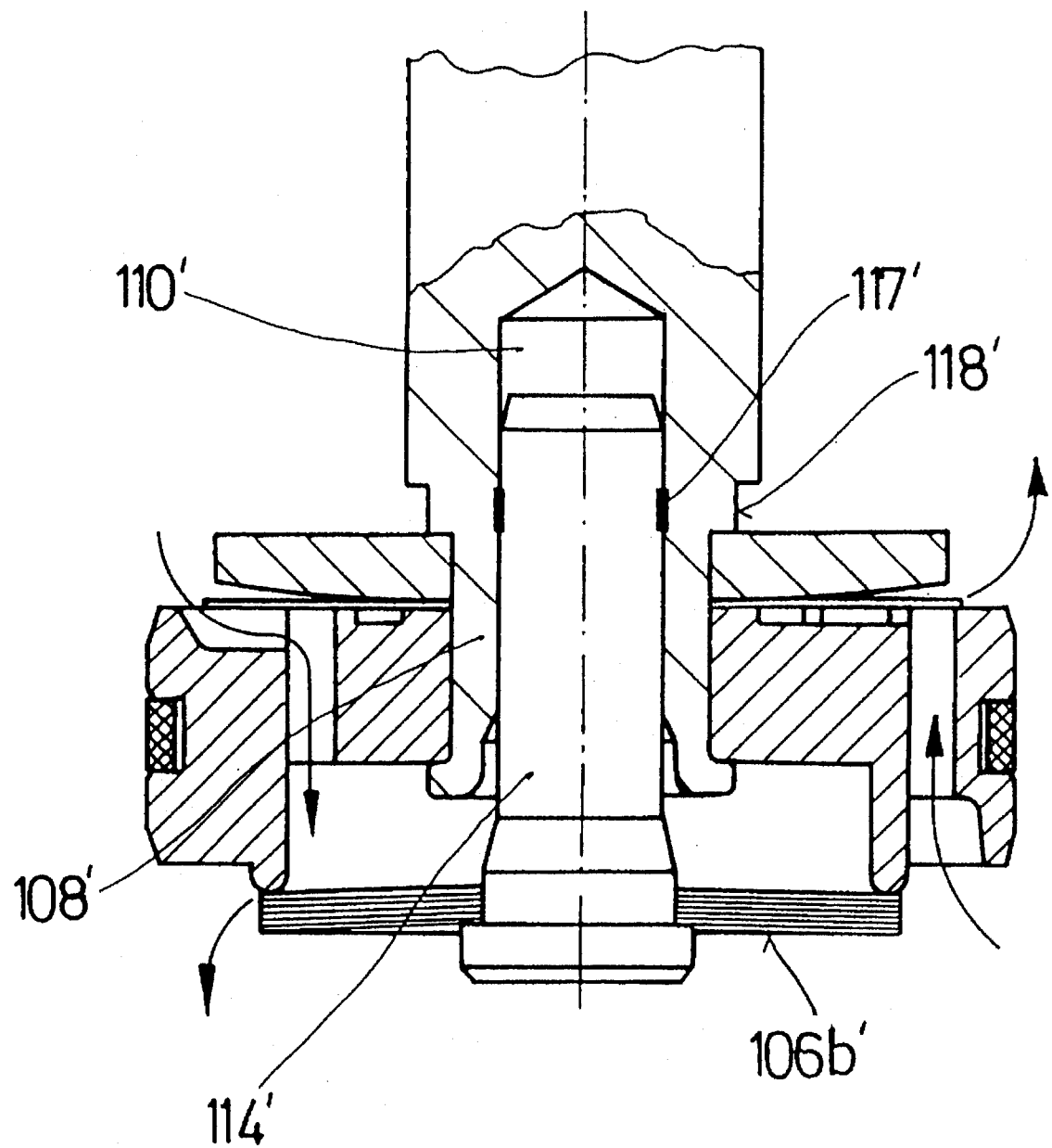
FIGS. 14 and 14a how further possible embodiments of a piston assembly.

FIG. 14 illustrates an additional type of connection, whereby a cylindrical component 114' is preferably housed in the hole 110' of the cylindrical component 108'. After the prestress has preferably been applied by means of the cylindrical component 114' on the valve discs 106b', the fastening can be realized, for example, by means of a laser weld 117'. The shoulder 118' preferably reduces the distance from the outside to the weld point 117', or in different embodiments the shoulder 118' can preferably be used to achieve a distance which is preferably approximately equal along the circumference of the cylindrical component 108'.

Figure 14A:
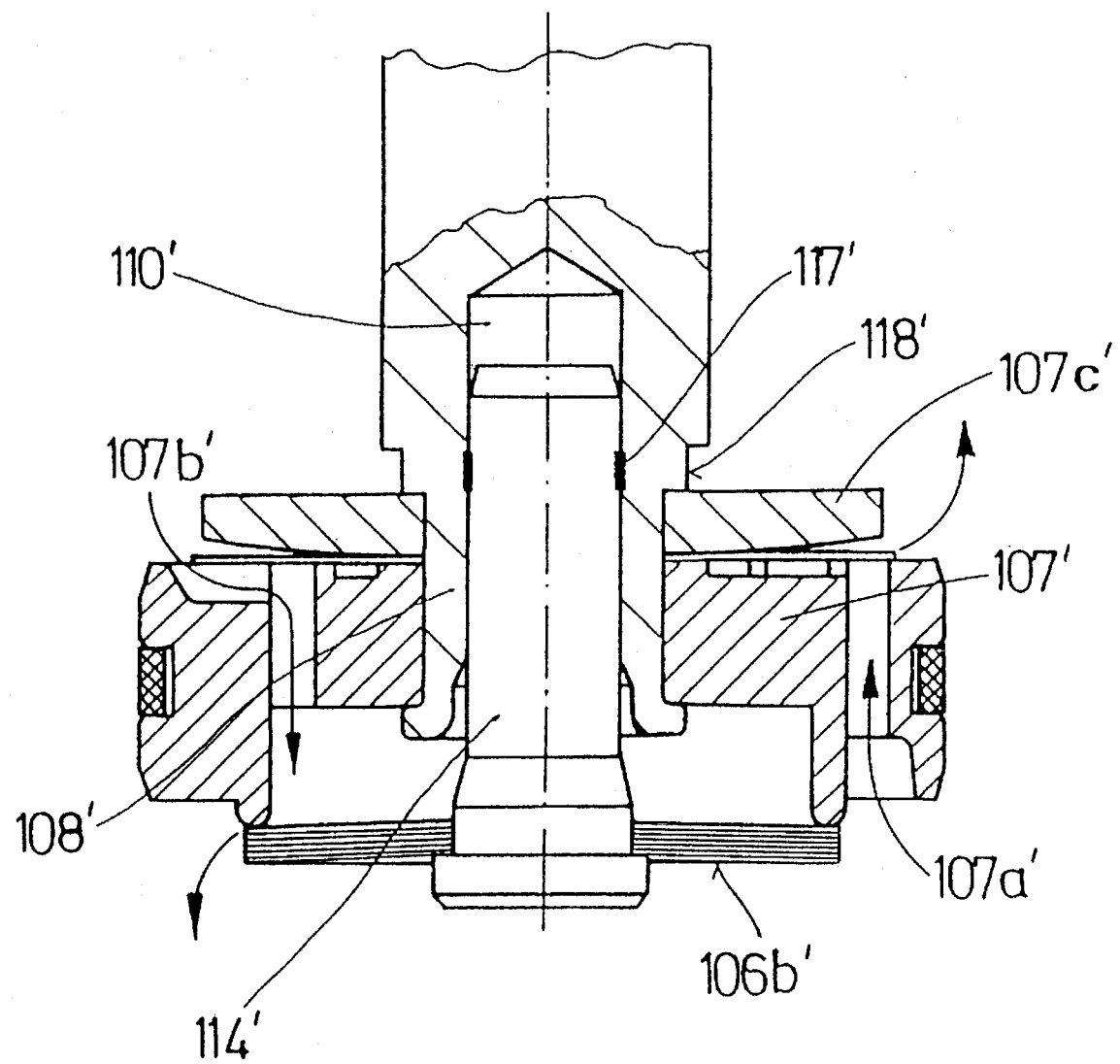

As shown in FIG. 14a, one embodiment of the present invention may include the passages 107a' and 107b' of the valve body 107'. The piston 103' may also include a valve 107c'. The passages 107a' and 107b', and valve 107c' are well known in the art and will not be discussed further here.

FIGS. 15a–15d illustrate one example of the sequence of an automatic assembly process. In FIG. 15a, valve discs 106a' and the valve body 107' are preferably threaded onto the piston rod 102', which are then (FIG. 15b) preferably connected together by means of the riveted joint 115'. The valve discs 106b' are then (FIG. 15c) preferably assembled with the cylindrical element 114'. After the application of the prestress (FIG. 15d), the fastening is preferably performed, e.g. by means of the weld 117'.

Figure 16:
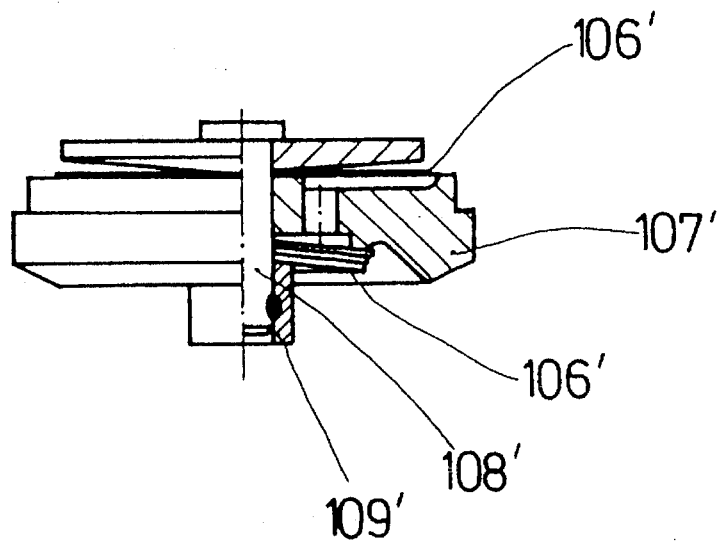
FIGS. 16 and 16a show another possible embodiment of a piston assembly.
Figure 16A:
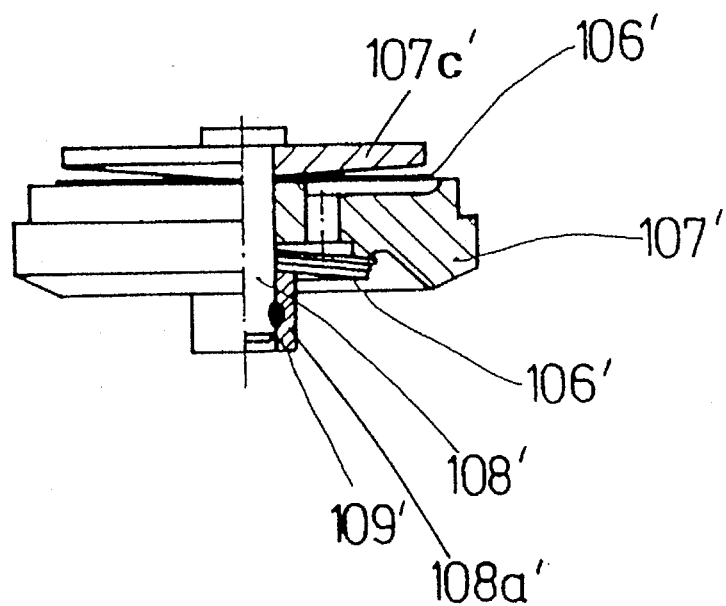

FIG. 16 illustrates a bottom valve, in which bottom valve once again the valve discs 106' and the valve body 107' are preferably threaded onto the cylindrical component 108', and are axially prestressed preferably by means of a fastening element 109' and fastened by means of a weld joint 108a' (see FIG. 16a).

Alternatively, this weld joint 108a' (see FIG. 16a) can preferably be replaced by a positive connection (not shown), in which the fastening element 109' and the cylindrical component 108' are preferably connected by means of an expander element 111', similar to the one illustrated in FIG. 12, which expander element 111' is preferably introduced in a hole (not shown) of the cylindrical component 108'. Here again, it is also possible to shrink fit the fastening element 109' onto cylindrical component 108', similar to the arrangement illustrated in FIG. 13.

Various types of bottom valves in which the present invention may be incorporated in a manner similar to that described with regard to FIGS. 16 and 16a may be disclosed in U.S. Pat. No. 4,802,561 and U.S. Pat. No. 4,650,042, both cited previously herein.

Various types of forming processes which may conceivably be utilized in accordance with the embodiments of the present are disclosed in "Metal Forming Fundamentals and Applications", by Altan et al., published by the American Society for Metals in 1983. Pages 8 through 35 describe various forming techniques and methods which may be used to form various components of the present invention.

Various types of forming machines and forming tools which may conceivably be utilized to form various components of the present invention are also discussed in the aforementioned publication on pages 103, 119, 120, 126, and 174–177. Some examples of forming machines discussed in the aforementioned pages are screw presses, crank presses, rolling mills, and hammers.

Further, the process of plastic deformation, which process in at least some aspects may apply to the forming of the various components of the embodiments of the present invention, is discussed on pages 45–82 of the aforementioned publication.

The aforementioned publication, "Metal Forming Fundamentals and Applications", the complete text thereof and the specific pages cited hereinabove, are hereby incorporated by reference as if set forth in their entirety herein.

One feature of the invention resides broadly in the shock absorber with frequency-selective action, consisting of a working cylinder filled with damping liquid and divided into two working chambers by a piston which has throttle valves and is fastened to a piston rod, characterized by the fact that corresponding to the working cylinder 3 there are at least two hydraulic capacitances (Ch), one of which is connected to the lower working chamber 1a by means of a hydraulic inductance (Rh).

Another feature of the invention resides broadly in the shock absorber characterized by the fact that at least one capacitance (Ch) is connected to the lower working chamber 1a by means of a hydraulic inductance (Rh).

Yet another feature of the invention resides broadly in the shock absorber characterized by the fact that corresponding to the working cylinder 3 there are three hydraulic capacitances (Ch1), (Ch2), (Ch3).

Still another feature of the invention resides broadly in the shock absorber characterized by the fact that the upper working chamber 1b is provided with one hydraulic capacitance (Ch3) and the lower working chamber 1a is provided with two hydraulic capacitances (Ch1), (Ch2).

A further feature of the invention resides broadly in the shock absorber characterized by the fact that the hydraulic capacitance (Ch) is a hydraulic accumulator 5, 6 preloaded with compressed gas.

Another feature of the invention resides broadly in the shock absorber characterized by the fact that the capacitance (Ch) of the upper working chamber 1b is designed as an equalization chamber 2 preloaded with compressed gas and axially separated from the upper working chamber 1b by a separating piston 10.

Yet another feature of the invention resides broadly in the shock absorber characterized by the fact that one of the capacitances (Ch) is designed as a mechanical capacitance.

Still another feature of the invention resides broadly in the shock absorber characterized by the fact that the mechanical capacitance is an elastic rubber element.

A further feature of the invention resides broadly in the shock absorber characterized by the fact that the hydraulic inductance (Lh) is a flow connection 4.

Another feature of the invention resides broadly in the shock absorber characterized by the fact that the flow connection is a pipe and/or hose line.

Yet another feature of the invention resides in the shock absorber characterized by the fact that the equalization chamber 2 is located radially.

Still another feature of the invention resides broadly in the shock absorber characterized by the fact that the separating piston 10 is realized as a ring, or disc-shaped, separating piston.

A further feature of the invention resides broadly in the shock absorber characterized by the fact that at least one capacitance (Ch) coaxially surrounds the working chamber 3.

Another feature of the invention resides broadly in the shock absorber characterized by the fact that at least a portion of the partition of the capacitance (Ch) is elastic.

Other types of suspension systems and devices, shock absorbers and shock absorber components which could be utilized, or modified in accordance with the present invention are described by the following U.S. Pat. Nos. 4,650,042 to Knecht et al., entitled "Hydraulic Adjustable Shock Absorber"; 4,802,561 to Knecht and Ackermann, entitled "Adjustable Shock Absorber"; and No. 5,251,730 to Ackermann and Beck, entitled "Adjustable Vibration Damper".

Other examples of processes which utilize hydraulic capacitance and hydraulic inductance, which could possibly be utilized in accordance with the optimization of the capacitance and inductance in the present invention are described by the following U.S. Pat. No. 5,206,836 to Holzhausen, entitled "Method of Determining Position and Dimensions of a Subsurface Structure Intersecting a Wellbore in the Earth"; U.S. Pat. No. 4,517,844 to Powell, entitled "Fluid Damping Device for A Compliant System". Other examples may also be found in U.S. Pat. Nos. 3,665,948 issued in May 1972, and 4,335,729 issued in Jun. 1982.

The appended drawings in their entirety, including all proportions and/or shapes in at least one embodiment of the invention, are accurate and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 43 11 567.5, filed on Apr. 8, 1993 and P 43 27 358.0, filed on Aug. 14, 1993, having inventors Walter Schalles, Heinz Knecht and Joachim Lenze, and DE-OS P 43 11 567.5 and P 43 27 358.0 and DE-PS P 43 11 567.5 and P 43 27 567.0.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for damping vibrations of a motor vehicle, said shock absorber having a variable damping force for damping vibrations occurring at various vibration frequencies, said shock absorber comprising:

a first tubular member, said first tubular member comprising first means for attaching said first tubular member to one of: a wheel suspension and a support structure of the motor vehicle;

said first tubular member defining a first chamber therewithin, said first chamber comprising damping fluid therewithin and said first tubular member defining a longitudinal dimension;

piston rod means, said piston rod means having a first end within said first tubular member and a second end external to said first tubular member, said piston rod means being movable within said first tubular member in a direction along said longitudinal dimension of said first tubular member;

means for attaching said second end of said piston rod means to the other of: the wheel suspension and the support structure of the motor vehicle;

piston means disposed at said first end of said piston rod means, said piston means having a first side disposed adjacent said piston rod means and a second side opposite to said first side, and said piston means dividing said first chamber into a first chamber portion adjacent the first side thereof and a second chamber portion adjacent the second side thereof;

said piston means comprising valve means for restricting flow of damping fluid between said first and second chamber portions;

means for varying the damping force of said shock absorber in relation to the vibration frequency, said means for varying comprising:
 first means for providing hydraulic capacitance, said first means for providing hydraulic capacitance being in fluid communication with said second chamber portion;
 second means for providing hydraulic capacitance, said second means for providing hydraulic capacitance being in fluid communication with said first chamber portion; and
 means for providing hydraulic inductance, said second means for providing hydraulic capacitance being connected to said first chamber by said means for providing hydraulic inductance;

said first means for providing hydraulic capacitance, said second means for providing hydraulic capacitance, and said means for providing hydraulic inductance, together collectively being configured for providing predetermined damping of said shock absorber at at least one predetermined vibration frequency, the at least one predetermined vibration frequency comprising a vibration frequency of a motor vehicle;

said first tubular member of the shock absorber comprises a sole cylinder having a piston and piston rod therein, and said piston comprises a sole piston within said sole cylinder, said sole piston dividing said sole cylinder into said first and second chamber portions; and said shock absorber further comprising third means for providing hydraulic capacitance, said third means for providing hydraulic capacitance being in fluid communication with one of said first and second chamber portions.

2. The shock absorber according to claim 1, further including:

said third means for providing hydraulic capacitance being connected to said first chamber portion;

said first means for providing hydraulic capacitance, said second means for providing hydraulic capacitance, said third means for providing hydraulic capacitance, said means for providing hydraulic inductance, and said valve means, together collectively being configured for providing variable damping of said shock absorber at said at least one predetermined vibration frequency of a motor vehicle;

said first means for providing hydraulic capacitance comprising a first hydraulic accumulator;

said second means for providing hydraulic capacitance comprising a second hydraulic accumulator;

said third means for providing hydraulic capacitance comprising a third hydraulic accumulator; and each of said first, second and third hydraulic accumulators comprising a pressurized gas therewithin.

3. The shock absorber according to claim 2, wherein:

said first hydraulic capacitance comprises a pressure equalization chamber preloaded with compressed gas, the equalization chamber being disposed radially about said second chamber portion, and the compressed gas of the equalization chamber being separated from the damping fluid of said second chamber portion by separating means; and said means for providing hydraulic inductance comprises a tubular member connecting said first chamber portion to said second means for providing hydraulic capacitance.

4. The shock absorber according to claim 3, wherein said equalization chamber coaxially surrounds said first chamber;

said predetermined vibration frequencies comprise natural resonating frequencies of both a body of a motor vehicle and wheels of a motor vehicle;

said separating means comprises a separating piston;

said tubular member comprises at least one of: a pipe and a hose line;

said first hydraulic accumulator comprises at least a first cross-sectional dimension and a first length dimension;

said second hydraulic accumulator comprises at least a second cross-sectional dimension and a second length dimension;

said third hydraulic accumulator comprises at least a third cross-sectional dimension and a third length dimension;

said tubular member comprises at least a fourth cross-sectional dimension and a fourth length dimension;

said first cross-sectional dimension, said first length dimension, said second cross-sectional dimension, said second length dimension, said third cross-sectional dimension, said third length dimension, said fourth cross-sectional dimension and said fourth length dimension being configured, in relationship to one another, to provide substantially maximum damping at the natural resonating frequencies of both a body of a motor vehicle and wheels of a motor vehicle, and less than maximum damping at frequencies other than the natural resonating frequencies.

5. The shock absorber according to claim 4, wherein:

said separating piston comprises a ring separating piston;

said pressurized gas comprises nitrogen;

said valve means of said piston means comprises first and second uni-directional valves, said first uni-directional valve being disposed for flow of damping fluid from said first chamber portion to said second chamber portion, and said second uni-directional valve being disposed for flow of damping fluid from said second chamber portion to said first chamber portion;

each of said first and second uni-directional valves comprising biasing means, said biasing means having a resistance for resisting opening of said first and second uni-directional valves;

said natural resonating frequencies comprise a first frequency band ranging from about 0.4 Hz to about 2.0 Hz for a vehicle body and a second frequency band ranging from about 8.8 Hz to about 11.9 Hz for vehicle wheels; and said first cross-sectional dimension, said first length dimension, said second cross-sectional dimension, said second length dimension, said third cross-sectional dimension, said third length dimension, said fourth cross-sectional dimension, said fourth length dimension and said resistance of said first and second valves being configures, in relationship to one another, to provide a damping minimum at a frequency between said first frequency band and said second frequency band, and to provide decreasing damping at increasing frequencies greater than said second frequency band.

6. The shock absorber according to claim 2, wherein:

said first hydraulic accumulator comprises an equalization chamber preloaded with compressed gas, the equalization chamber being axially separated from said second chamber portion by separating means, said separating means comprising one of:

piston means; and partition means, at least a portion of said partition means being elastic; and said means for providing hydraulic inductance comprises a tubular member extending from said first chamber portion to said second means for providing hydraulic capacitance.

7. The shock absorber according to claim 1, wherein at least one of said first, second and third means for providing hydraulic capacitance comprises a mechanical capacitance.

8. The shock absorber according to claim 7, wherein the mechanical capacitance comprises an elastic rubber element.

\* \* \* \* \*

UNITED STATES PATENT AND TRADEMARK OFFICE
CERTIFICATE OF CORRECTION

PATENT NO. : 5,477,947
DATED : December 26, 1995
INVENTOR(S) : Walter SCHALLES, Heinz KNECHT and Joachim LENZE It is certified that error appears in the above-indentified patent and that said Letters Patent is hereby corrected as shown below:

In column 3, line 55, after 'first', delete "sided" and insert --side,--.

In column 5, line 25, after '14a', delete "how" and insert --show--.

In column 7, line 6, after the first occurrence of 'Q-' insert --quantity--.

In column 22, line 29, Claim 5, after 'being', delete "configures," and insert --configured,--.

Signed and Sealed this

Eighteenth Day of February, 1997

Attest:

BRUCE LEHMAN

*Attesting Officer*  *Commissioner of Patents and Trademarks*